United States Patent [19]

Hicks et al.

[11] Patent Number: 4,964,065
[45] Date of Patent: * Oct. 16, 1990

[54] COMPUTER-CONTROLLED ELECTRONIC SYSTEM MONITOR

[75] Inventors: John R. Hicks, Lone Oak; Peter Mailandt, Dallas, both of Tex.

[73] Assignee: Decibel Products, Inc., Dallas, Tex.

[ * ] Notice: The portion of the term of this patent subsequent to Apr. 18, 2006 has been disclaimed.

[21] Appl. No.: 243,326

[22] Filed: Sep. 9, 1988

Related U.S. Application Data

[63] Continuation-in-part of Ser. No. 25,216, Mar. 12, 1987, Pat. No. 4,823,280.

[51] Int. Cl.$^5$ ............... G06K 15/00; G01R 19/00
[52] U.S. Cl. ............... 364/514; 364/550; 364/483; 340/552; 324/639; 455/67
[58] Field of Search ............ 364/480, 481, 483, 514, 364/550, 551.01, 148, 152; 455/67, 68, 115; 324/103 R, 140 R, 141, 142, 58 R, 58 A, 58.5 R, 58.5 B, 58 B; 340/514, 517, 526, 635, 653, 660, 661, 540, 541, 552

[56] References Cited

U.S. PATENT DOCUMENTS

| | | | |
|---|---|---|---|
| 4,476,535 | 10/1984 | Loshing et al. | 364/550 |
| 4,584,650 | 4/1986 | Kozuch | 364/481 |
| 4,603,325 | 7/1986 | Marino et al. | 455/67 |
| 4,789,948 | 12/1988 | von der Embse | 364/514 |
| 4,823,280 | 4/1989 | Mailandt et al. | 364/514 |

Primary Examiner—Parshotam S. Lall
Assistant Examiner—Brian M. Mattson
Attorney, Agent, or Firm—Hubbard, Thurman, Turner, Tucker & Harris

[57] ABSTRACT

An electronic communication system monitor in one embodiment has sensors for sensing electrical and environmental conditions for communication system elements. Control relays connect the elements to a programmable controller. The programmable controller has a keyboard, display, printer and modem for remote communication of information; especially alarms providing notice of operating conditions outside acceptable parameters. A second embodiment provides a logic circuit connected to selected sensors which determines when a combination of conditions exist to cause alarm and automatically activates a remedial device to alleviate a potential problem. The central processor also has: a message synthesizer and a connector for communicating a message using dual-tone multifunction coded signals or digitized voice signals to maintenance, emergency and security personnel or remote computers as appropriate; a memory for accumulating information and report preparation instructions for preparing reports of current alarms, alarm history, current status, relay status, channel monitor, and channel on time reports; and instructions for set-up. Manual or automatic operation is provided.

13 Claims, 23 Drawing Sheets

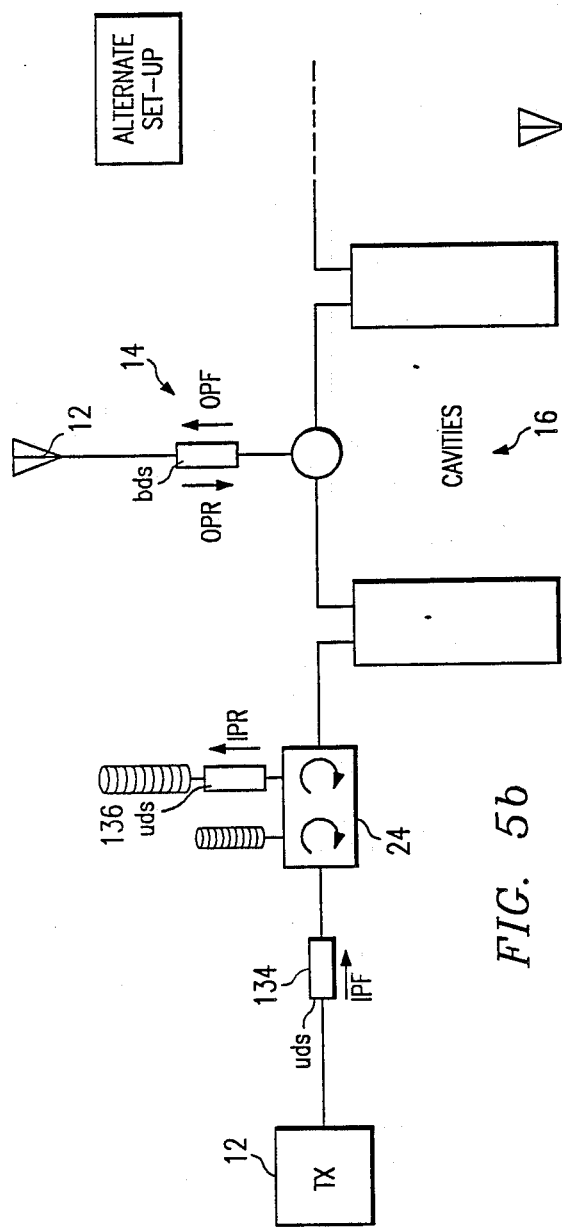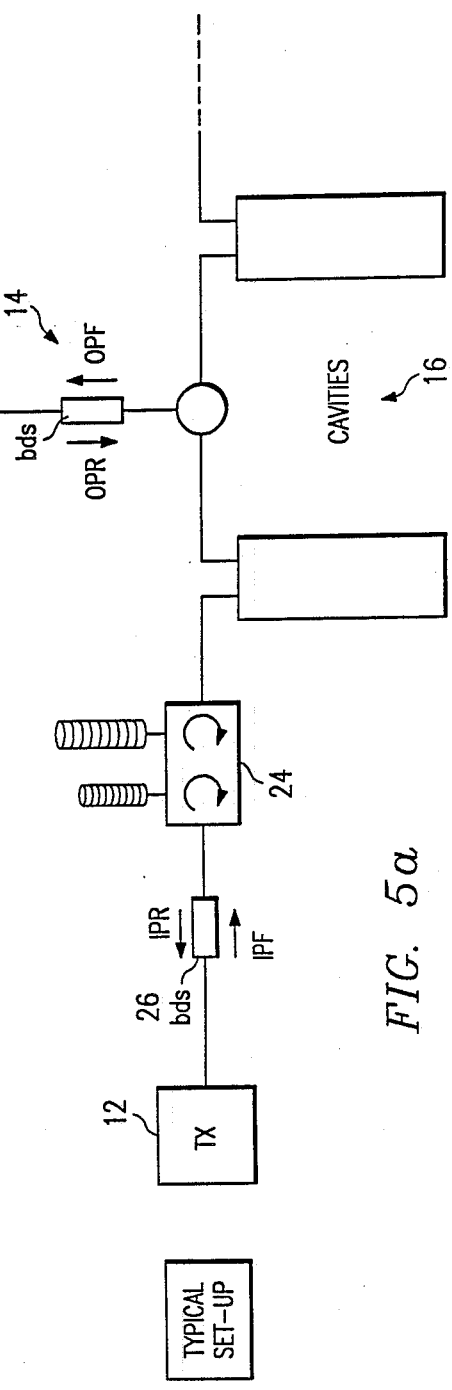
FIG. 5b
FIG. 5a

POWER MONITOR CRT PROCESSING

COMPUTER-CONTROLLED ELECTRONIC SYSTEM MONITOR

This application is a continuation-in-part of U.S. patent applicaiotn Ser. No. 025,216, filed Mar. 12, 1987, now U.S. Pat. No. 4,823,280, issued 4/18/89 for a Computer-Controlled Electronic System Monitor.

BACKGROUND OF THE INVENTION

This invention relates to electronic monitoring systems and more particularly to a computer-controlled monitoring system for monitoring continuously and accurately the operation of communication systems.

Electronic monitors of various degrees of complexity are known. They range from very simple power monitors, which measure power at a specific location near the transmitter, circular, cavity, N-way junction or antenna, to more versatile models which provide remote readout at an off-site panel that accepts and/or delivers information pertaining to power level and voltage standing wave ratio (VSWR). In addition, some units are known to include remote communication of alarms, corresponding on/off power conditions, and local environment conditions such as, temperature, humidity, intrusion and fire.

The problems with the known monitoring devices include their inability to generate and communicate actual measurements, to permit the programming of upper and lower operating limits, and to adapt to specific operator needs such as calculating specific insertion loss characteristics across filters and cavities.

A major advantage of the monitor of the present invention over known monitors is the provision of a computer-controlled, expandable electronic monitoring system. The system of the present invention accurately and continuously monitors electronic systems, programs their operating parameters, meets various user needs, and tunes or retunes any tunable components without degrading overall performance of the system being monitored. These features enable the monitor to detect "soft" failures of the systems being monitored. Soft failures are the result of a slowly degrading system component, such as a corroding connector or a gradual shift in a cavity's resonant frequency. With properly set alarm limits, the monitoring system uncovers and communicates a transmit problem when performance drops below tolerable limits.

SUMMARY OF THE INVENTION

Accordingly, it is an object of the present invention to provide an improved electronic system monitor to give accurate information continuously from which "soft" failures can be detected and repaired prior to actual system failure, thereby reducing system downtime and maintenance and repair costs.

Another object of this invention is to provide an electronic system monitor operable in a centralized control center for monitoring one or more electronic systems remotely located with respect to the system center.

Still another object of the invention is to provide a monitor capable of simultaneous operation with an electronic system without interrupting or degrading the electronic system operation.

Yet another object of the invention is to provide a monitor having multiple alarm inputs and automatic remote or local alarm reporting.

A further object of the invention is to provide a monitor capable of measuring the operational outputs of a plurality of electronic systems.

Still a further object of the invention is to provide a monitor having component tuning aid capability.

Still yet a further object of the invention is to provide a monitor capable of monitoring selected conditions and in response to the conditions activating a corrective device.

An additional object of the invention is to provide a monitor with the capability of activating various communication modes for automatically notifying selected personnel of problems existing in the monitored system.

Still another object of the invention is to provide a monitor system whose size is adjustable to meet existing monitoring requirements.

Yet another additional object of the invention is to provide a monitor adapted for use with a portable keyboard/display device.

Briefly stated, the electronic system monitor apparatus of a first embodiment of the present invention includes a compact, computer-controlled, expandable monitor system having remote sensors for accurately measuring the actual power-related performance of a plurality of components of one or more electronic systems and their local environment conditions. A decision maker is connected to some or all of the sensors and compares the measured power-related outputs of the sensors to normal operating limits for determining deteriorating components. The decision maker activates an appropriate alarm and reports any abnormal component or environmental conditions to a central or remote station either automatically or upon command. At the station, the report is displayed or printed or both. The decision maker also provides information for use in tuning or retuning tunable components.

In a second embodiment, the decision maker includes a logic circuit for determining the existence of a plurality of operation conditions for elements producing a single function and when found to exist automatically activating a remedial element for alleviating a potential problem. The decision maker or control processing unit also includes a message synthesizer including a voice synthesizer for producing messages and a communication connector for communicating the message to selected maintenance, emergency, and security personnel, and remote computers. In addition to reporting current alarms, the central processing unit stores information and prepares alarm history, current status, relay status, channel monitor and channel on time reports. The central processor also provides for manual operation and prompts for guiding manual operation and initial setup of the system. The central processing unit is adapted for expansion using master and slave units, and for connecting a portable display/keyboard. Thus, the portable display/keyboard may be carried for use with master units at different sites.

BRIEF DESCRIPTION OF THE DRAWINGS

Other objects and features of the invention will become more readily apparent from the detailed description when read in conjunction with the accompanying drawings in which:

FIGS. 5a–5b are block diagrams of two typical monitor and sensor arrangements of the present invention;

DETAILED DESCRIPTION OF THE PREFERRED EMBODIMENT

Figure 1:
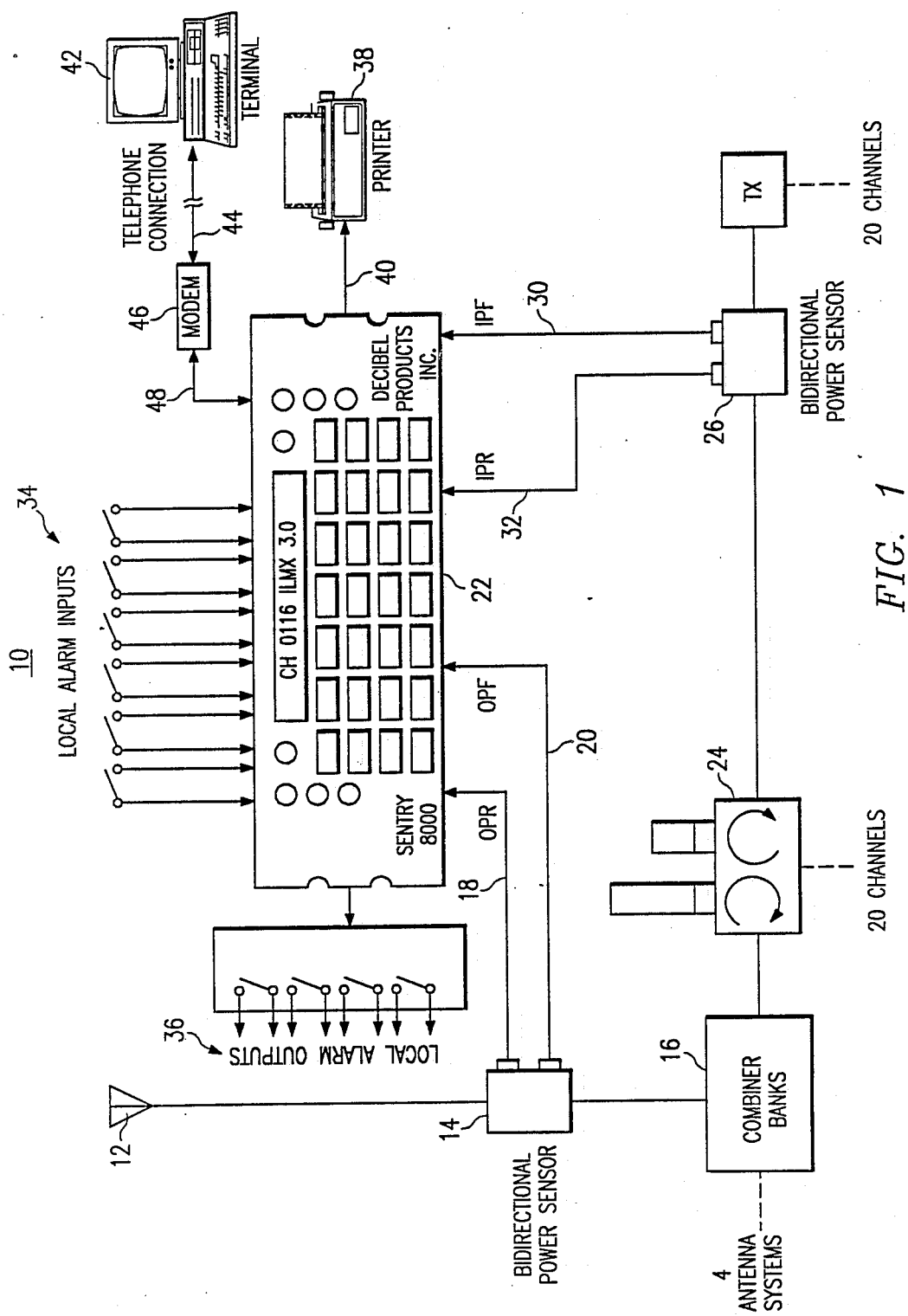
FIG. 1 is a block diagram of the monitoring system of the present invention with in-line sensors in place.

A first embodiment of the computer-controlled electronic system monitoring system 10 of the present invention is shown in FIG. 1 in connection with an antenna system, by way of example only and not by way of limitation. The monitor of the present invention is applicable to all communications systems operating from 35 MHz to 1 GHz, including SMR trunked, conventional, paging cellular, mobile radio and aviation. The monitor of the present invention can report on a plurality of antenna systems and any combination of a plurality of transmitters and channels therefor.

The monitor of the present invention is shown connected to a transmitter site system (FIG. 1) with in-line sensors of the monitoring system 10 in place. The combined antenna system and monitor system includes a transmitter antenna 12 having a bidirectional power sensor 14 connected between the antenna and a bank of combiners 16 each for a plurality of antenna systems. The bidirectional power sensor 14 is connected by leads 18 and 20 to a programmable controller 22. A circulator 24 for a plurality of communications channels is connected to the combiner banks 16 and a bidirectional power sensor 26 is connected between the circulator 24 and a transmitter 28 serving a plurality of channels. The bidirectional power sensor 26 is connected by leads 30 and 32 to the programmable controller 22.

A plurality of local alarm input circuits 34 are connected to the programmable controller for inputting information indicative of various operating failures and adverse local environmental conditions at the antenna sites. Also, a plurality of local alarm output circuits 36 are connected to the programmable controller 22.

A printer 38 is connected by bus 40 to the programmable controller 22. Upon command from the programmable computer, the printer prints selected information from the programmable computer.

A terminal 42 that provides two-way communication to the programmable controller completes the combined system. The terminal is connected by a telephone connection 44 to a MODEM 46. The MODEM 46 is connected by lead 48 to the programmable controller.

The in-line antenna bidirectional sensor 14 inputs analog (dc) signals indicative of the output reflected power (OPR) from the antennas for a particular channel through lead 18 to the programmable controller 22 for display in watts. The sensor 14 also inputs analog signals indicative of the output forward power (OPF) of the combiner 16 for a given antenna through lead 20 to the programmable controller 22 for display in watts.

In addition, the in-line combiner bidirectional sensor 26 inputs analog signals indicative of the input forward power (IPF) to the combiner 16 for a particular channel on lead 30 to the programmable controller for display in watts. Further, the sensor 26 inputs analog signals indicative of the input reflected power from the combiner 16 for a particular channel through lead 32 to the programmable controller for display in watts. This sensor arrangement will be discussed further in connection with a second arrangement hereinafter.

The local alarm system circuits 34 include sensors to facilitate flexible and diverse local alarm needs such as, for example, intrusion, temperature, and flooding in addition to the outside-the-norm measurements of the antenna, combiner, and transmitter.

Figure 2:
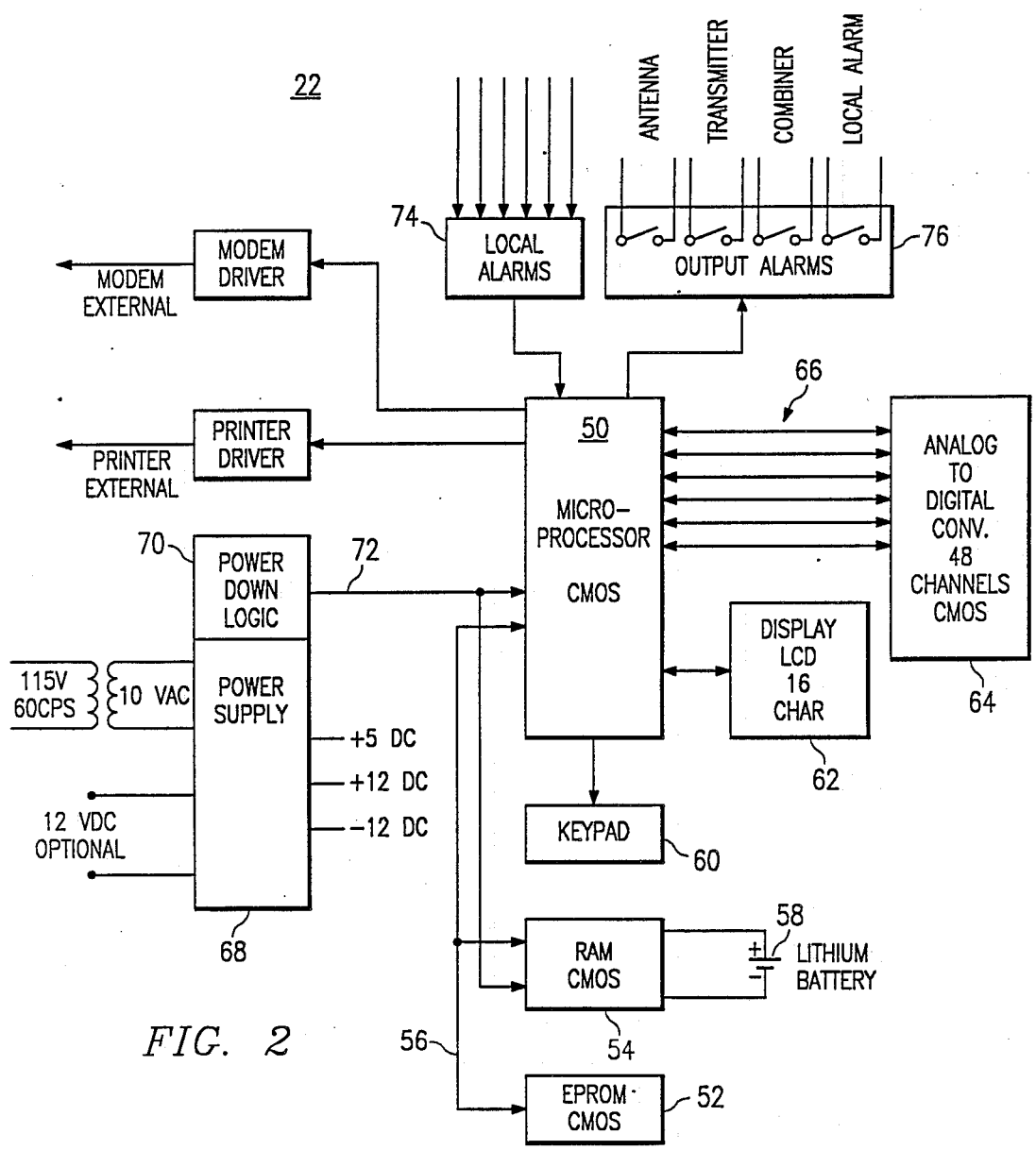
FIG. 2 is a block diagram of the programmable controller of the present invention.

The programmable controller 22 (FIG. 2) includes a computer 50. A suitable computer is an INTEL 8085 microprocessor sold by INTEL Corporation. An electrically programmable read only memory (EPROM) 52 and a random access memory (RAM) 54 are connected by bus 56 to the microprocessor 50. The EPROM stores instructions to adapt the system to user needs, and the RAM stores the system acquired data or information by date and time provided by the microprocessor clock. The RAM 54 is protected from a power down situation by a battery 58 (Lithium battery).

A keyboard 60 is used to enter operation parameters and to call up information for display on a display 62. The display 62 is, for example, a 16 digit liquid crystal display connected to the microproccessor.

An analog to digital converter (ADC) 64 having a plurality of channels for digitizing the incoming analog (dc) data signals is connected by leads 66 to the microprocessor 50.

The microprocessor 50, EPROM 52, RAM 54, and ADC 64 and interface circuitry are preferably complementary metal oxide semiconductor (MOS) integrated circuit (IC) devices because they are readily available, have less power consumption and dissipation, and exhibit high impedance characteristics. Thus, a small Lithium battery will hold the RAM for about three years, and the high impedance of CMOS devices allow interfacing without disruption of the system.

The microprocessor 50 is connected to a power supply 68. The power supply provides a +5 volt and a ±/-12 volt source of power for the system from either an ac or dc power source. The power supply is connected to power-fail circuit 70. The power-fail circuit is connected by lead 72 to the microprocessor and RAM to signal when power failure is imminent to initiate a routing to save all volatile data. After power restoration, a routine is initiated to restore the data and restart computer operation.

The local alarm signals are received in a register 74 and multiplexed into the microprocessor 50 for processing. The microprocessor 50 is connected to a solid state relay device 76 for outputting alarm signals to antenna, transmitter, combiner, or local alarm action circuits.

Figure 3:
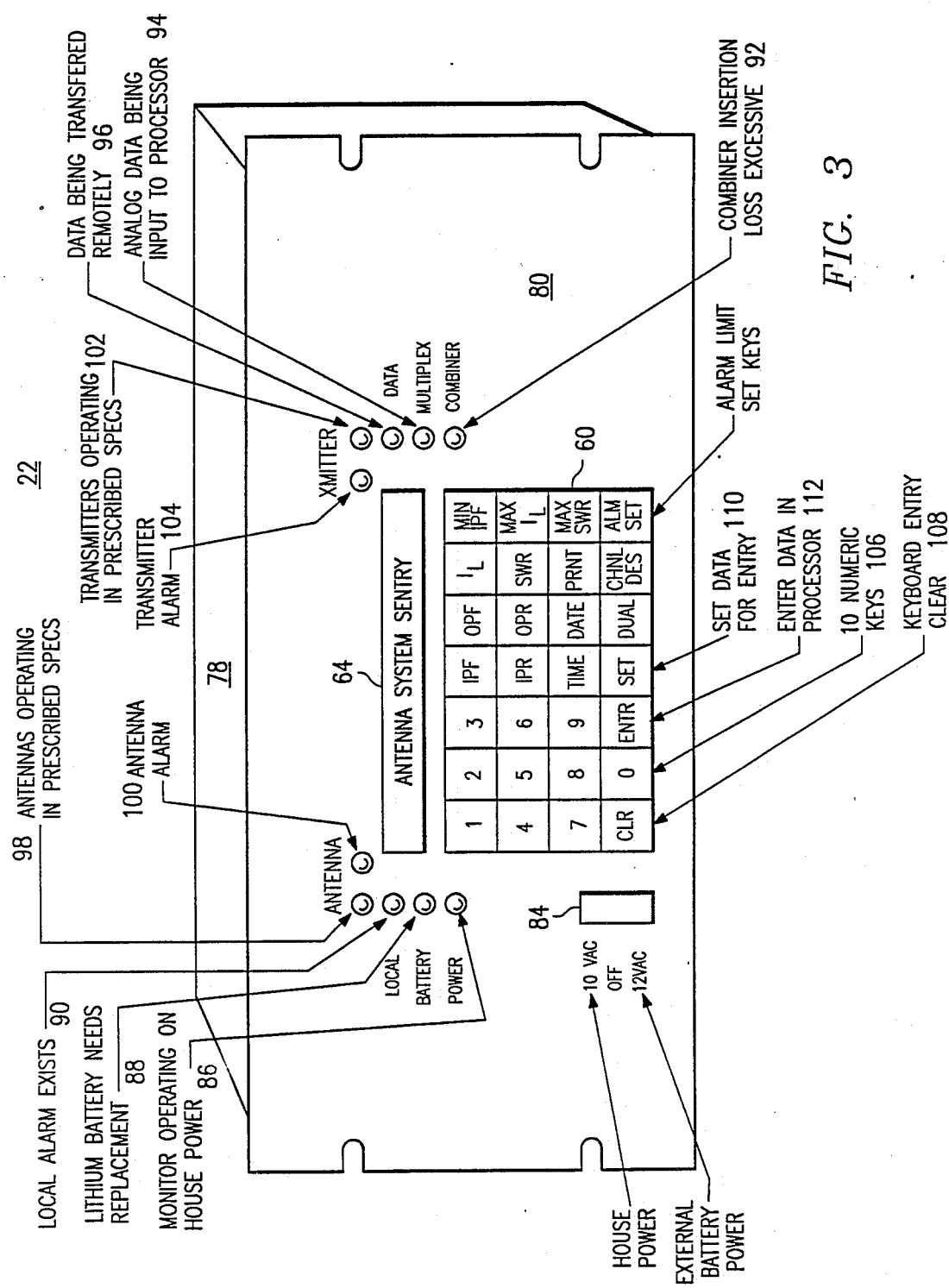
FIG. 3 is an isometric view of the programmable controller including the front panel arrangement of the present invention.
Figure 4:
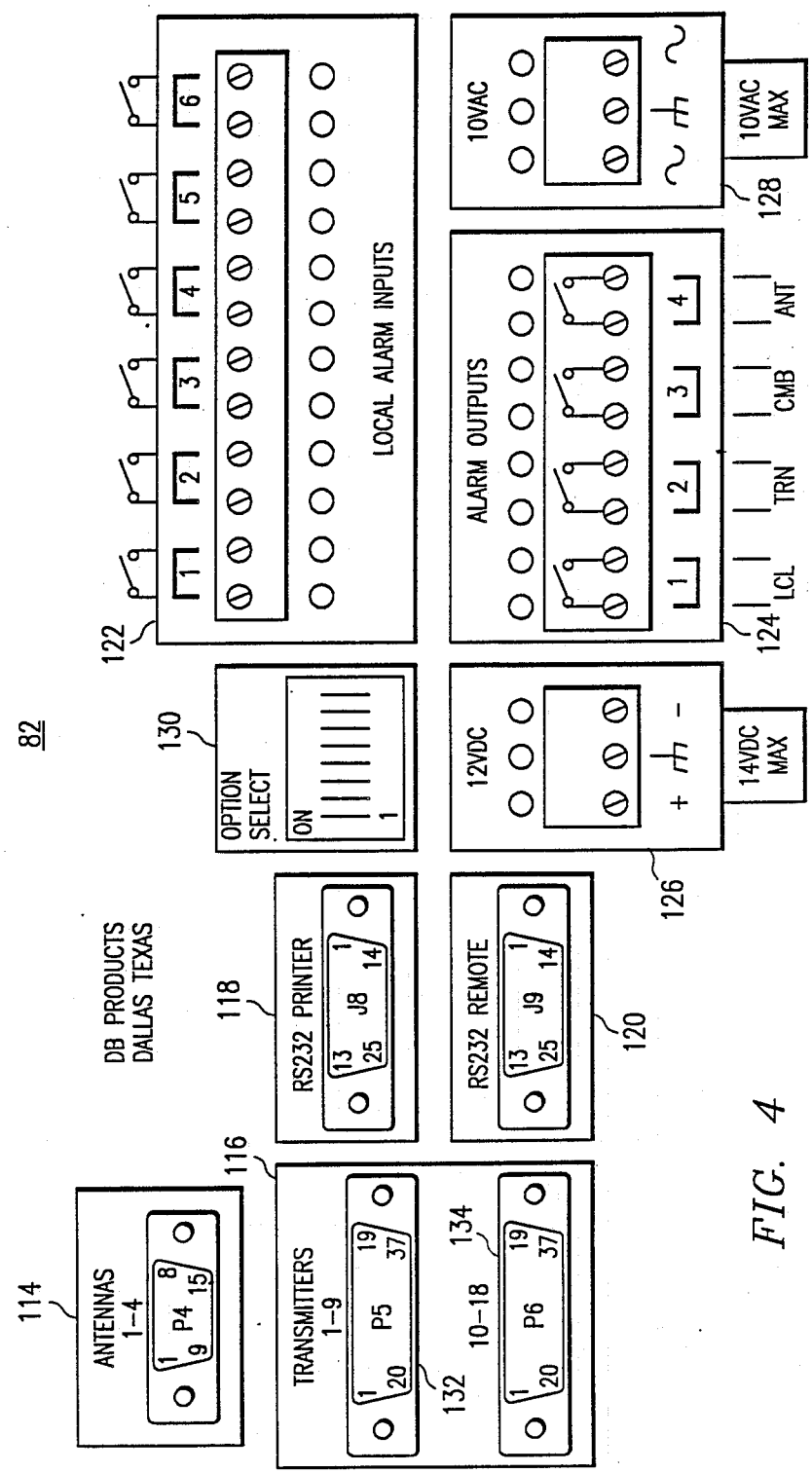
FIG. 4 is a view of the programmable controller connection panel of the present invention.

The programmable controller 22 includes a housing 78 (FIG. 3) for housing the circuitry of the programmable controller, a front panel 80, and a connector panel 82 (FIG. 4).

The programmable panel front panel 80 includes a switch 84 having an OFF position between ac and dc power positions. A plurality of status lights (LEDs) are connected to the microprocessor as action circuits indicating the operational status of the system as follows.

Lights 86, 88, and 90 on a first side of the panel are turned on to indicate, respectively, that the monitor is operating on home power, the Lithium battery for the data storage RAM needs replacement, and a local alarm exists. While, lights 92, 94, and 96 on a second or opposing side are turned on to indicate, respectively, that the combiner insertion loss is excessive, the analog data is being input to the processor, and the data is being transferred remotely. Indicator lights 86, 94, and 96 being of an informative nature are green lights; while lights 88, 90, and 92 being trouble indicating lights are red lights.

Antenna status lights 98 and 100 are turned on and off, respectively, to indicate whether the plurality of antennas are operating within prescribed parameters or an antenna alarm exists. The former is green and the later is red.

Similarly, transmitter lights 102 and 104 are turned on and off with a green light 102 indicating that the transmitters are operating within prescribed parameters and a red light indicating a transmitter alarm.

The 16 character liquid crystal display (LCD) 64 is positioned directly above the 28 key keyboard 60. The 28 key keyboard 60 includes 10 numeric (1, 2, 3, ... 0) keys 106 for providing numeric entry and access information. The specific entry and access keys include the usual clear 108, set 110, and enter 112 keys for clearing the keyboard of all information before it is entered in the processor, initializing new information to be input into the keyboard, and instructing the processor to take keyboard instructions and store them in memory.

The remaining specific keys are as follows:

An input forward power (IPF) key is to display in watts the input forward power to the combiner for a selected channel.

An output forward power (OPF) key is to display in watts the output forward power of the chamber for a selected antenna.

An insertion loss (IL) key identifies the channel loss through the combiner measured in dB.

A time of day (TME) key is to set a 24 hour clock in the processor one time and thereafter to update the date.

A dual display (DUL) key is used to enter a dual display mode. When in the dual mode, the processor shows two separate desired measurements on the same display. For example, when tuning a combiner, the value of IPR and OPF may be desired to show on the same display so that OPF may be optimized and IPR minimized.

A channel designate (CNL/DES) key is used to designate the antennas and channel(s) to be monitored and reported. From 0 to 18 channels may be designated in the example described for up-to-four antennas for measurement and monitoring.

An input reflected power (IPR) is used to identify the input reflected power in watts for a particular channel for display.

An output reflected power (OPR) key is used to identify the reflected power in watts from the antenna for a particular channel display.

A voltage standing wave ration (SWR) key displays VSWR in absolute values for any channel or antenna.

A minimum input power forward (MIN/IPF) key is used to set the alarm value for the minimum allowable transmitter output power before an alarm message is set off.

A maximum VSWR (MAX/SWR) key is used to set the alarm value for the maximum allowable VSWR for any channel or antenna before an alarm message is triggered.

A maximum insertion loss (MAX/IL) key permits the setting of the maximum combiner insertion loss value allowed prior to alarm triggering.

An alarm status (ALM/STS) key when momentarily pressed and followed by momentarily pressing the ENTER key will display a list of those channels that have not been cleared. The appropriate alarm is displayed with each channel.

A print (PRNT) key and the ENTER key when momentarily pressed one after the other causes a print out to be made of all channel information and alarm information not cleared to a local printer.

This completes the keys of the keyboard; nevertheless, additional functions are displayed using a combination of the keys simultaneously. A specific unit number for the processor is entered using the (SET) (CNL/DES) keys; while, a specific periodic report time is entered using the (SET) (ALMSTS) keys.

Referring now to FIG. 4, a description is given of the connection panel. The connection panel 82 for the programmable controller includes a pin connector 114 for up to four antennas, a pin connector 116 for up to 18 transmitters, and pin connectors 118 and 120, respectively, for a printer and remote terminal. In addition four terminal blocks 122, 124, 126, and 128 are provided for the local alarm inputs, alarm outputs, 12 V dc and 12 V ac, respectively. An option select dip switch 130 for communication options complete the connection panel.

With respect to the antenna connector 114, each antenna has an OPF pin, OPR pin, and corresponding ground pins. If a fifteen pin connector is used, antennas 3 and 4 share a common ground for OPR. Also to prevent cross-talk on all antenna and transmitter connections from power sensors, a shielded cable is used.

The pin connector 116 for the eighteen transmitters includes two 37 pin connectors 132 and 134. Each pin connector accomodates 9 transmitters. Each transmitter includes an IPF pin, IPR pin, and corresponding ground pins.

The local printer pin connector 118 and the remote terminal pin connector 120 are standard RS 232 connectors each including pin outs as follows:

Chassis and signal grounds (pins 1 and 7), Request to Send (pin 4), Data Terminal Ready (pin 20), Receive Data (pin 3), Transmit Data (pin 2), Clear to Send (pin 5), and Data Bit Ready (pin 6). The MODEM 46 (FIG. 1) has corresponding pins.

The local alarm inputs of terminal block 122 accept external dry contact closures providing the user optional alarm functions for recording and reporting. Thus, the programmable controller may report activation of up to six alarms indicative of, for example, unauthorized entry, high/low temperatures, water level, house power, etc.

The alarm outputs of terminal block 124 provide dry contact closures, capable of 2 amps, when a combiner antenna, transmitter or local alarm in the system shows operation outside preset parameters or conditions.

The dc and ac terminal blocks 126 and 128 provide the option to operate the monitor by conventional housepower with a class 2 transformer or by dc means.

Last, the eight dip switches 130 allow selection of different communication modes, speed of communication, and local printer interfacing.

Referring now to FIGS. 5a and 5b for a description of two typical sensor/antenna arrangements. FIGS. 5a is for obtaining a more accurate measurement of combiner insertion loss; FIG. 5b focuses on monitoring reflected power from the cavities for accurate combiner tuning. Both circuits measure antenna plus cable forward and reflected power for calculating the corresponding VSWR, and combiner tuning.

The circuit of FIG. 5a, is a typical circuit described in connection with FIG. 1. The second circuit is an alternative to the first circuit. The difference is that the bidirectional power sensor 26 of FIG. 5a that is positioned between the transmitter 12 and circulator 24 is replaced by two unidirectional sensors 134 and 136 (FIG. 5b). Unidirectional sensor 134 is positioned between the transmitter 12 and circulator 24 entrance port for measuring the input forward power (IPF). Unidirectional sensor 136 is positioned in the circulator port adjacent to the combiner before the 50 ohm matching resistor. In this arrangement the combiner (cavity) reflected power is measured as the input reflected power (IPR) and provides accurate measurement of the combiner insertion loss including isolation losses.

Figure 6A:
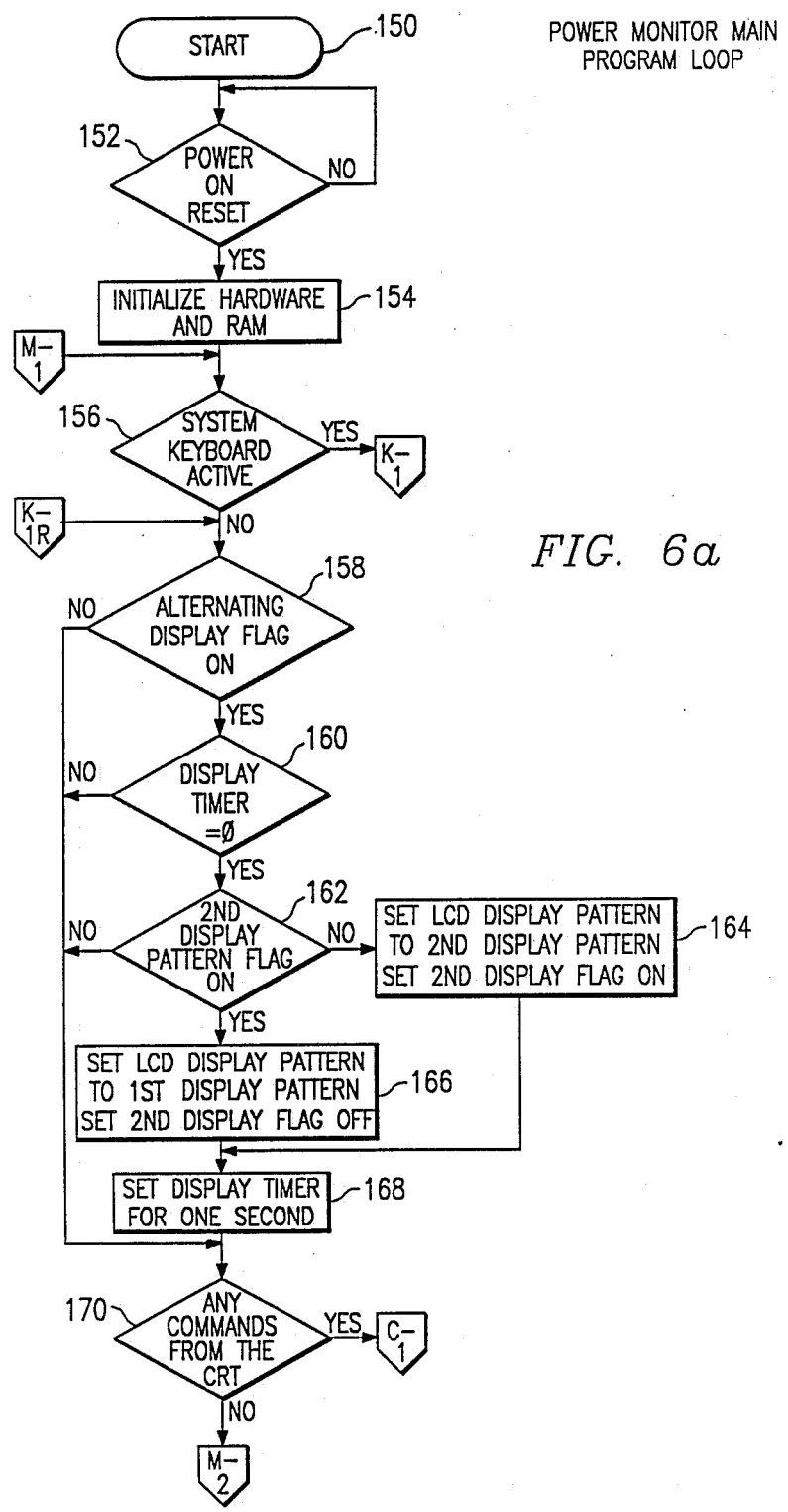
FIGS. 6a–6h are main program loop flowcharts for the power monitor of the present invention.

The operation of the monitor will now be described in connection with the operation flowcharts. The power monitor main program loop (FIG. 6a) starts 150 with a decision 152 whether the power is on and the system reset. If true, an instruction 154 is issued to initialize the hardware and random access memory (RAM); else, return is made to step 152. Next, a decision 156 is made whether the system keyboard is active. If true, the power monitor keyboard subroutine (FIGS. 7a-7e) is entered; else a decision 158 is made whether an alternating display flag is on.

If decision 158 is true, a decision 160 is made whether the display timer is equal to zero; else, a decision 170 is made whether any commands have been received from the CRT. If decision 160 is yes, a decision 162 is made whether a second display pattern flag is on; else the CRT on decision 172 is made. If decision 162 is no, then either the decision 172 is made whether any commands have been received for the cathode ray tube (CRT), or an instruction 164 is issued to set the liquid crystal display (LCD) pattern to the second pattern and to set the second display flag. Then an instruction 168 is issued to set the display timer for one second.

Figure 6B:
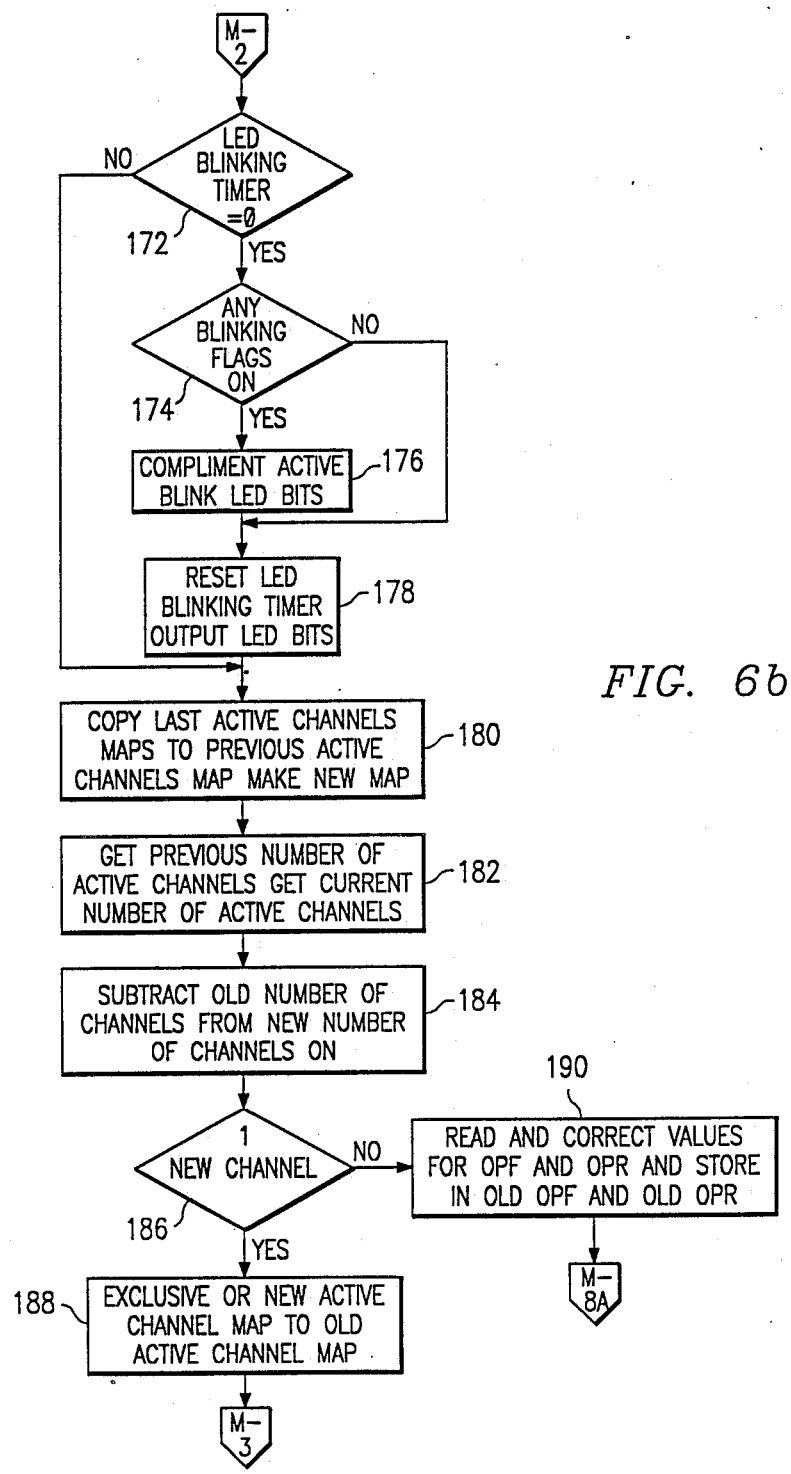
Figure 8A:
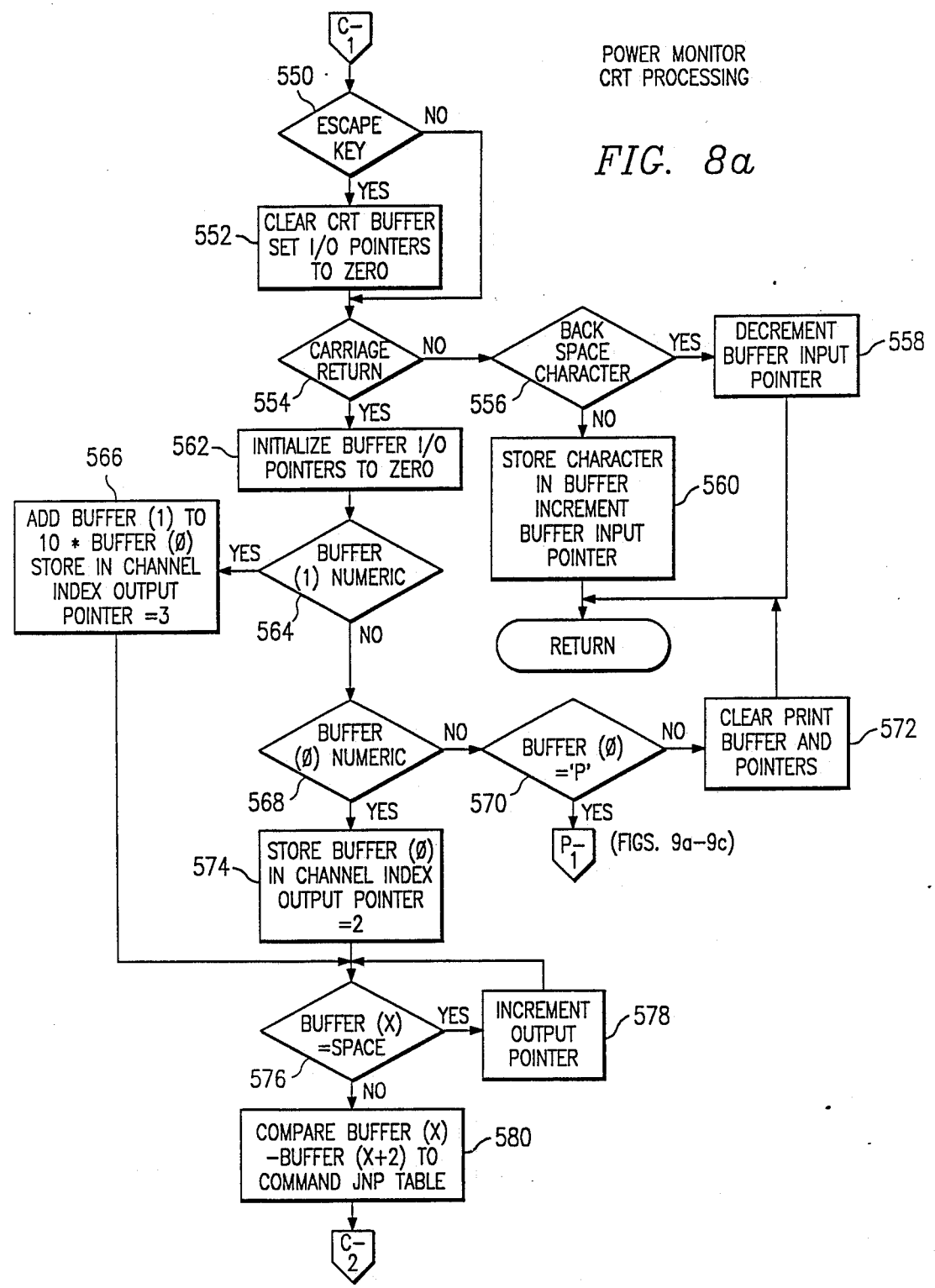
FIGS. 8a–8b are cathode ray tube (CRT) processing flowcharts for the power monitor of the present invention.
Figure 8B:
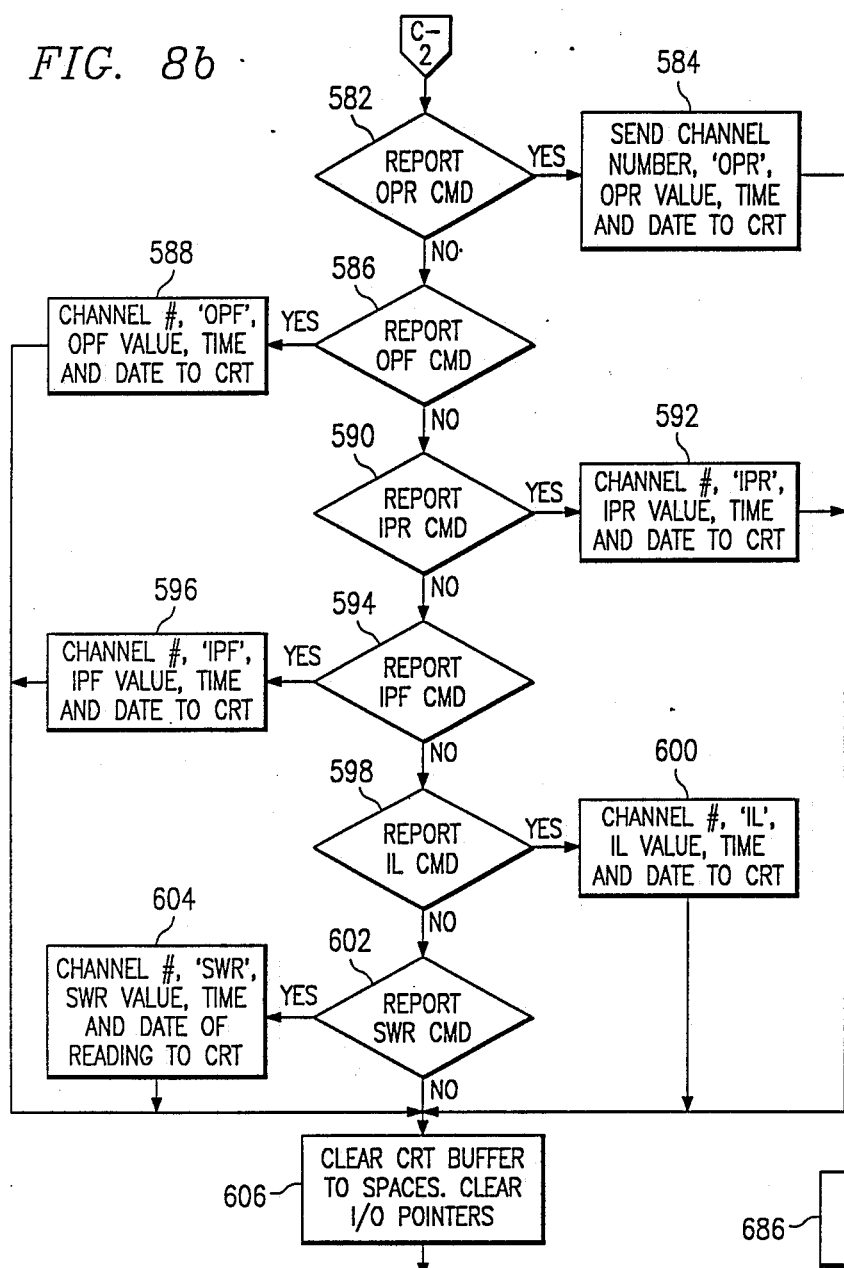

However, if decision 162 is true, an instruction 166 is issued to set LCD display pattern to the first display pattern, turn off the second display flag, and proceed to instruction 168 to set the display timer for one second. After setting the display timer for one second, the decision 170 is made whether any commands have been received from the CRT. If true, the CRT subroutines (FIGS. 8a and 8b) are entered; if false; a decision 172 (FIG. 6b) is made whether the LED blinking timer is equal to zero.

If the LED blinking timer is equal to zero, a decision 174 is made whether any blinking flags are on, otherwise an instruction 180 is issued to go directly to a map making instruction 180. If decision 174 is true, an instruction 176 is issued to complement the active blink LED bits and an instruction 178 is issued to reset LED blinking timer and output LED bits. If decision 174 is false, only the instruction 178 is issued. Then, the instruction 180 is issued to copy last active channel maps to previous active channels map and make a new map of channels.

Figure 6C:
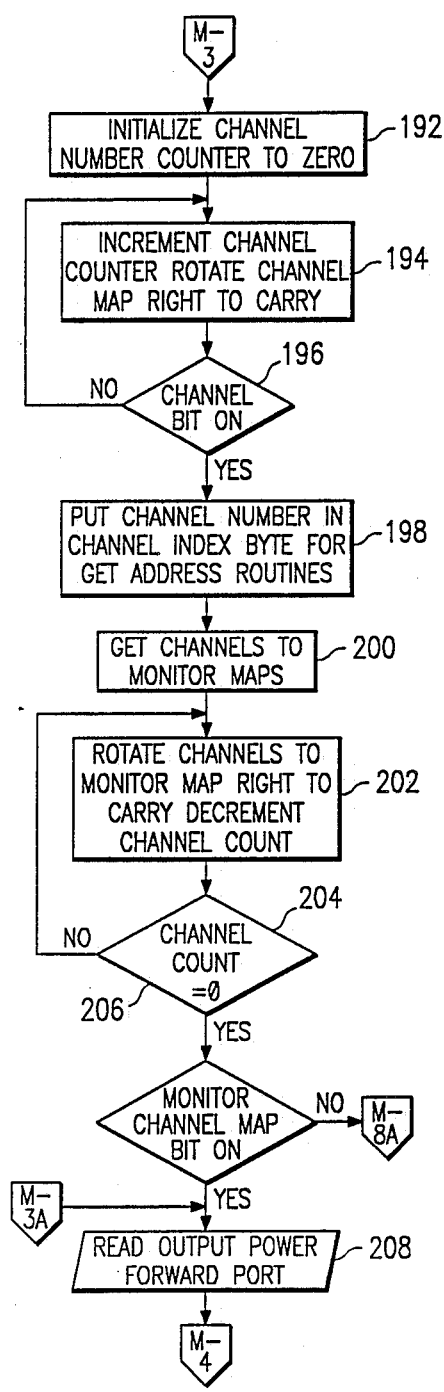
Figure 6D:
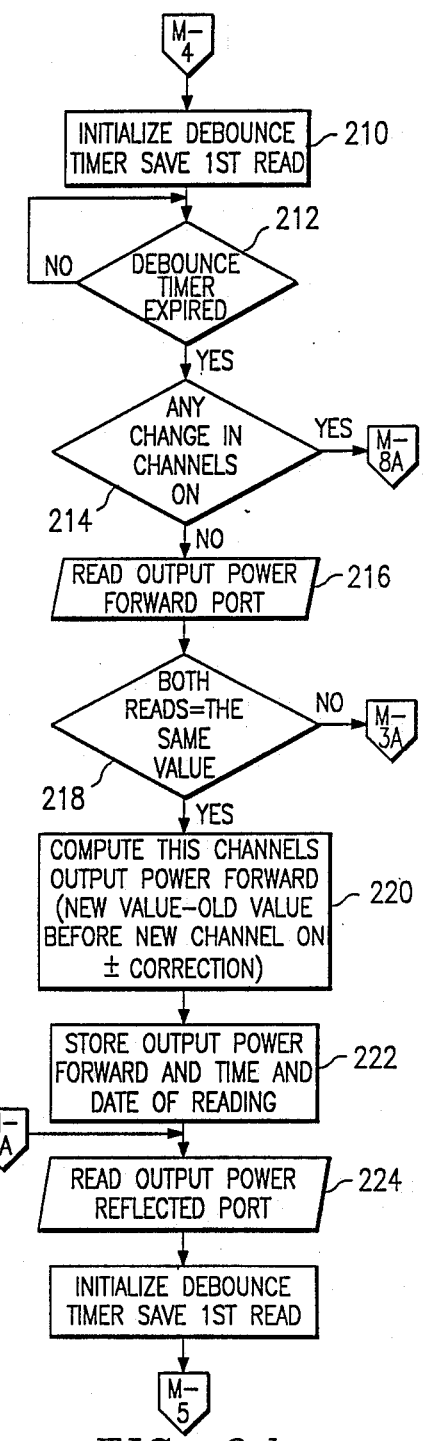
Figure 6E:
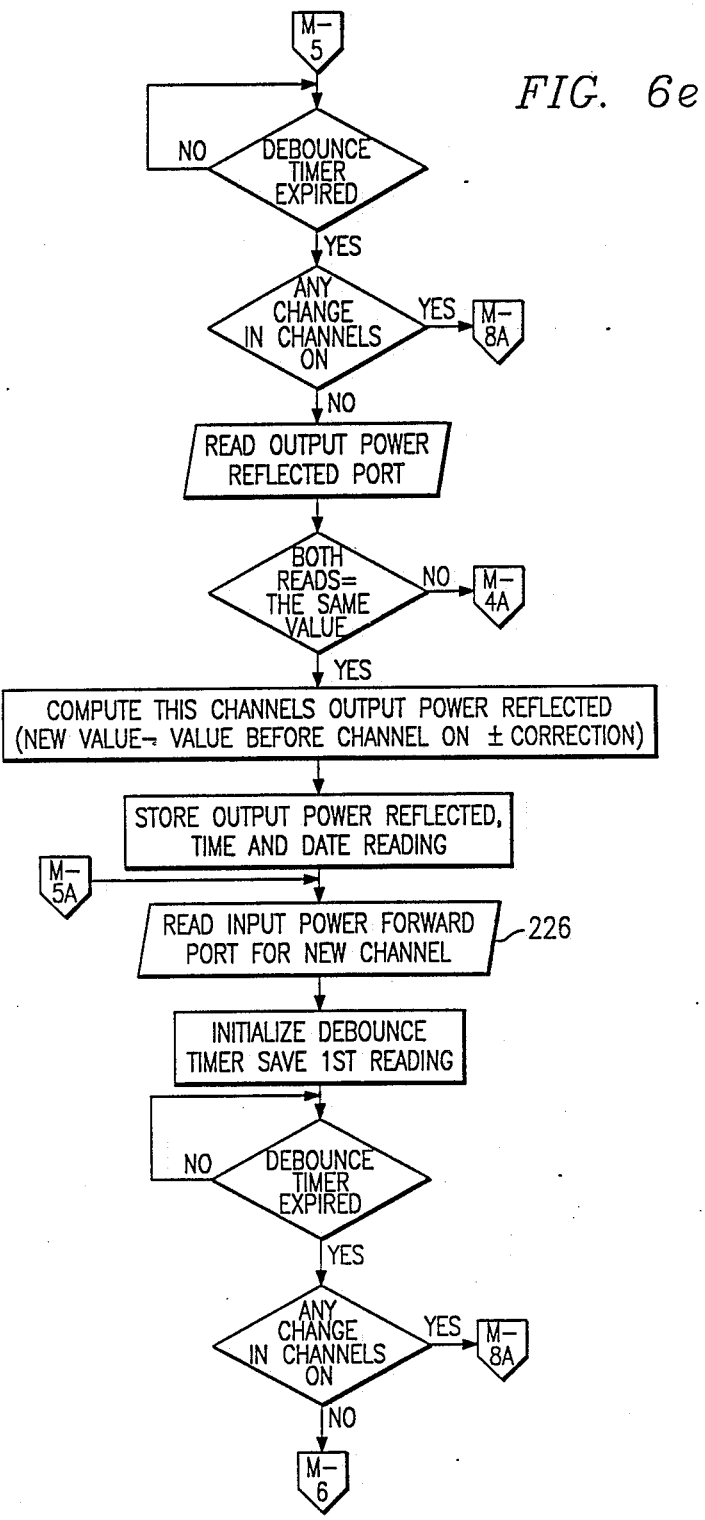

An instruction 182 is then issued to get the previous number of active channels and to get the current number of active channels. Next, an instruction 184 is issued to subtract the previous number of channels from the new number of channels on, and a decision 186 made whether there is a new channel. If yes, an instruction is issued to exclusive OR the new active channel map to the old active channel map. Otherwise, an instruction 190 is issued to read and correct values for output power forward (OPF) and output power reflected and store in the old OPF and OPR positions before proceeding directly to decision 264 (FIG. 6h) as to whether an automatic print time is on and continue.

Next, an instruction 192 (FIG. 6c) is issued to initialize the counter for the number of channels in the system to zero, and an instruction 194 is issued to increment the channel counter for each channel while rotating the channel map to the right to carry. Then a decision 196 is made whether the channel bit is on. If not, return is made to instruction 194; if true, an instruction 198 is issued to put the channel number in channel index byte for the get address routines. Then an instruction 202 is issued to rotate channels to monitor map right to carry decrement channel count and a decision 204 is made whether the channel count has been decremented to zero. If it hasn't, the instruction 202 to decrement the channel count is repeated until true, and then a decision 206 is made whether the monitor channel map bit is on. If the channel map bit is not on, the process skips to decision 264 (FIG. 6h) and continues from there; otherwise, an instruction 208 is issued to read the output power forward (OPF) port.

After reading the OPF port, an instruction 210 (FIG. 6d) is issued to initialize a debounce timer and to save the first reading. Then a decision 212 is made whether the debounce time has expired. If not the decision 212 is continued until the time has expired, at which time a decision 214 is made whether any channels are on. If true, the process goes to decision 264 (FIG. 6h) and continues. Otherwise, an instruction 216 is issued to read the OPF port.

Next, the two OPF values are compared and a decision 218 made whether they are equal. If not equal, return is made to step 208 (FIG. 6c) to read OPF port. If equal, an instruction 220 is issued to compute the channel OPF and pursuant to instruction 222 to store the new OPF and time and date of reading.

Next, an instruction 224 is issued to read the output power reflected (OPR) port, after which the process is repeated (FIGS. 6d and 6e), the OPR value computed and stored together with time and date of reading.

Figures 6F, 6G:
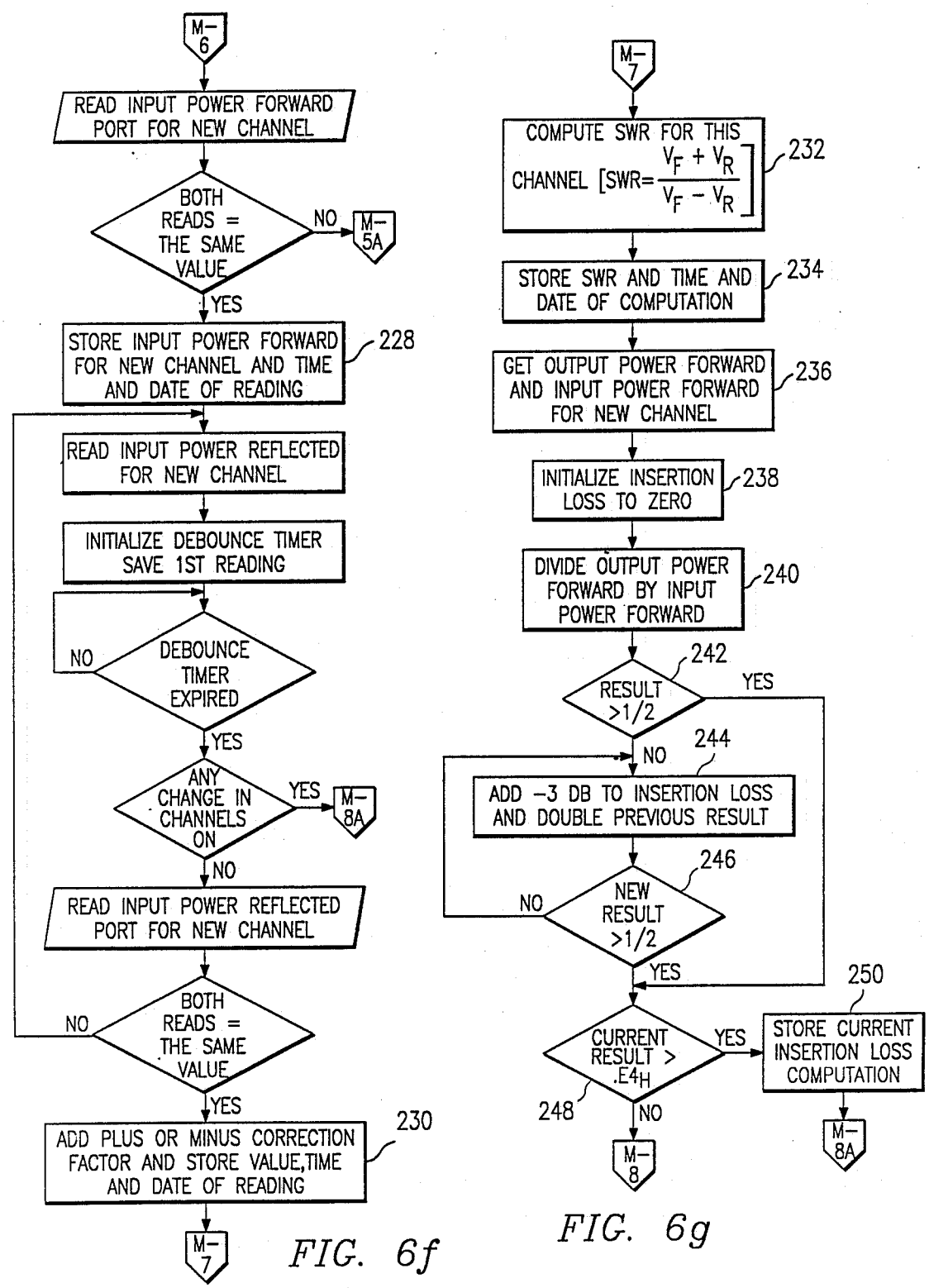
Figure 6H:
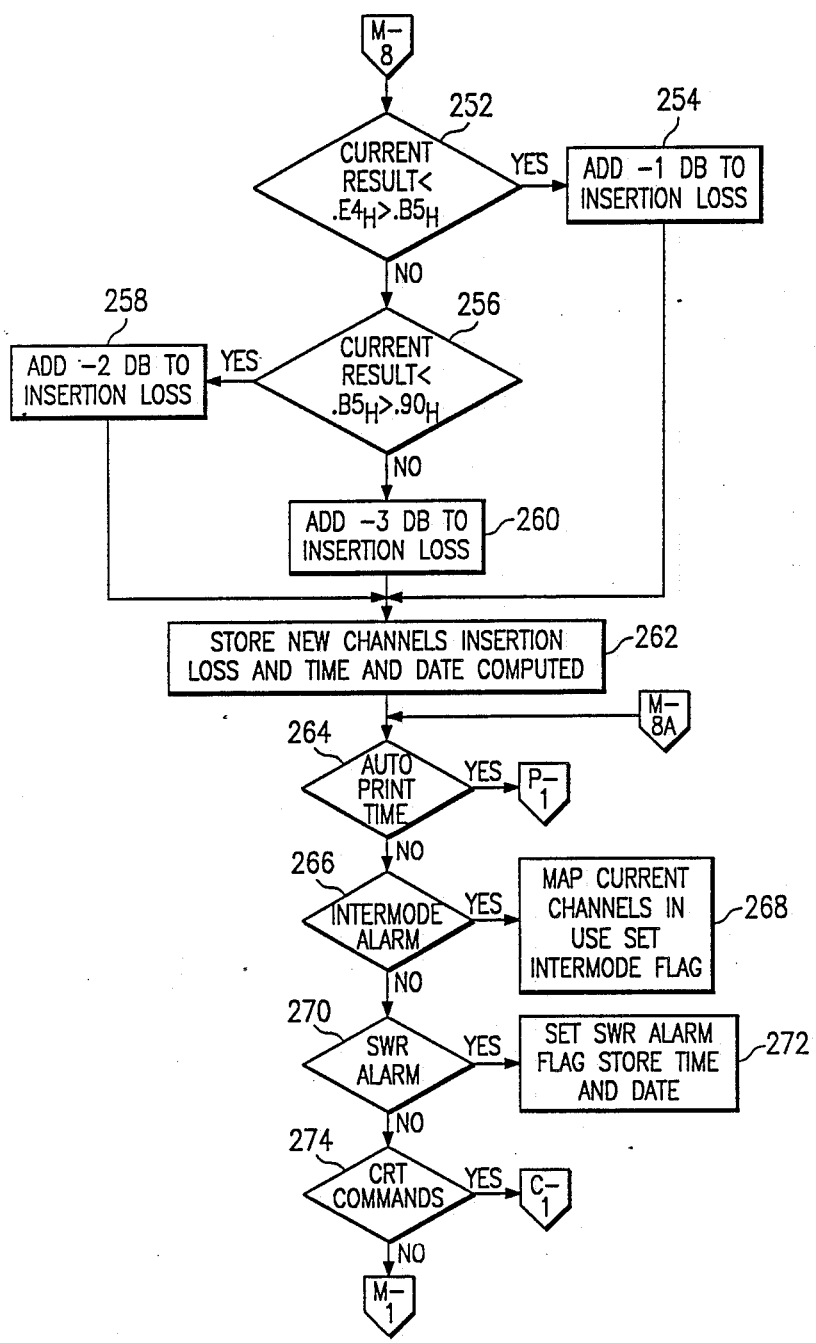

Next, an instruction 226 (FIG. 6e) is issued to read the input power forward (IPF) port for a new channel, repeat the debounce process and store the IPF for the new channel pursuant to instruction 228 (FIG. 6f). The process is repeated for computing the input power reflected (IPR) for the new channel (FIG. 6f) and the new IPR value for the new channel computed and stored pursuant to instruction 230.

After computing the OPF and OPR and IPF and IPR, the voltage standing wave ratio (SWR) (FIG. 6g) for the channel is computed pursuant to instruction 232 using the formula:

$$[SWR = (VF + VR)/(VF - VR)]$$

After computation, an instruction 234 is issued to store the SWR together with the time and date of computation.

Next, an instruction 236 is issued to get OPF and IPF for new channel, and pursuant to instruction 238 initialize the insertion loss to zero. Then an instruction 240 is issued to divide the OPF by the IPF and a decision 242 made whether the result is greater than one half. If not, an instruction 244 is issued to add $-3$ dB to insertion loss and double the previous result, and a decision 246 is made whether the new result is greater than one-half. If no, step 244 and 246 are repeated until the new result is greater than one-half.

If decision 242 was yes or when decision 246 becomes true that the result is greater than one-half, a decision 248 is made whether the current result is greater than $.E4_H$. If true, an instruction 250 is issued to store current insertion loss computation and proceed directly to an auto print time decision 264 and continue; if false, a decision 252 (FIG. 6h) is made whether current result is less than $.E4_H$ which is greater than $.B5_H$. If yes, an instruction 254 is issued to add $-1$ dB to the insertion loss and proceed to instruction 262; else a decision 256 is made whether current result is less than $.B5_H$ which is greater than .90 H. If true, an instruction 258 is issued to add $-2$ dB to the insertion loss and go to instruction 262; else an instruction is issued to add $-3$ dB to the insertion loss and proceed to instruction 262. Instruction 262 is issued to store the new channel's insertion loss value and time and date of computation.

Next, a decision 264 is made whether the auto print time is on. If yes, the print subroutine (FIGS. 9a and 9b) is entered; else a decision 266 is made whether an intermode alarm exists. If true, an instruction 268 is issued to map current channels in use and set the intermode flag; else a decision 270 is made whether the SWR alarm is on. If on, an instruction 272 is issued to set SWR alarm flag and store time and date of alarm receipt; else a decision 274 is made whether CRT commands are being received. If true, the CRT subroutine (FIGS. 8a and 8b) is entered; else return is made to decision 156 (FIG. 6a) as to whether the keyboard is active and continue.

KEYBOARD SUBROUTINE

The keyboard subroutine (FIGS. 7a-7e) starts with an instruction 300 to read the keyboard ports and a decision 302 made whether a key has been pressed. If not, return is made to decision 158 (FIG. 6a) of the main program loop for continuation; otherwise an instruction 304 is issued to initialize the debounce timer. After debounce timer initialization, a decision 306 is made whether the debounce time has expired; if false the decision is repeated until the time has expired. If the time has expired, an instruction 308 is issued to read the keyboard ports a second time, and a decision made whether the key is still active. If not active a return is made to decision 156 (FIG. 6a) as to whether the keyboard is active and continue. If the key is still active a decision 312 is made whether the same key is still active, if not return is made to instruction 300 to read the keyboard ports. If true, a decision 314 is made whether the key pressed is a numeric key; if not the process continues at K-3 (FIG. 7c). If true, a decision 316 (FIG. 7b) is made whether a first digit entry flag exists. If a first digit entry flag exists, an instruction 318 is issued to clear the display, display the new digit, set the second entry flag, store the digit 10 in temporary byte zero, and return to decision 156 (FIG. 6a), hereinafter referred to as M-1, of the main program loop.

If decision 316 is no, then a decision 320 is made whether a second digit entry flag exists; if yes, an instruction 322 is issued to add the digit to the temporary byte zero, put the digit in display, set the third entry flag, and return to M-1 (FIG. 6a); else a decision 324 is made if the third digit entry flag exists. If yes, instruction 326 is issued to store digit 10 in temporary byte 1, display the digit, set the fourth entry flag, and return to M-1 (FIG. 6a); else, decision 328 is made whether the fourth entry flag exists. If true, the digit is added to the temporary byte 1, displayed, and the first entry flag is set prior to return to M1 (FIG. 6a); else return is made to M1 (FIG. 6a).

Figures 7A, 7B:
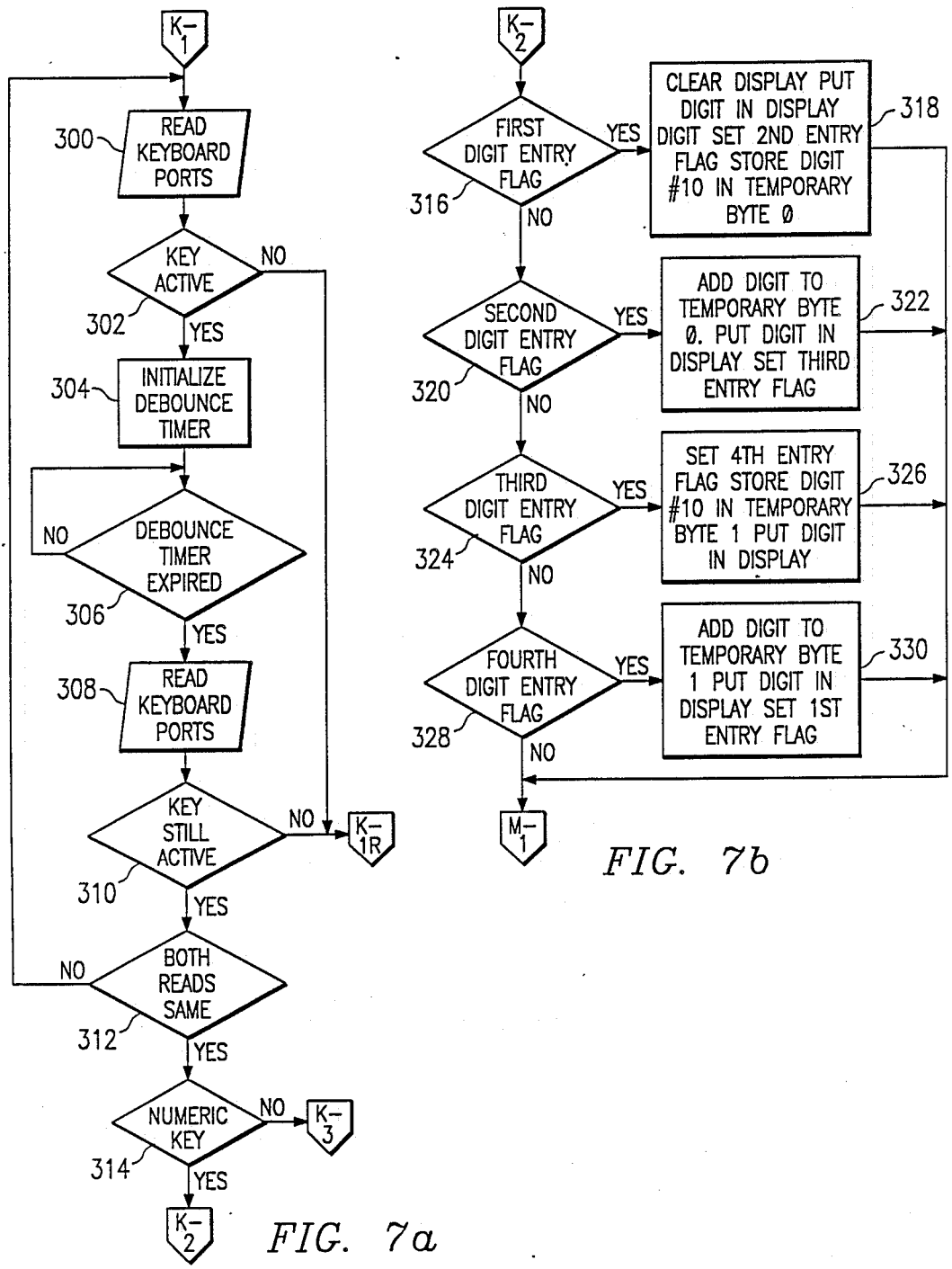
FIGS. 7a–7e are keyboard flowcharts for the power monitor of the present invention.
Figure 7C:
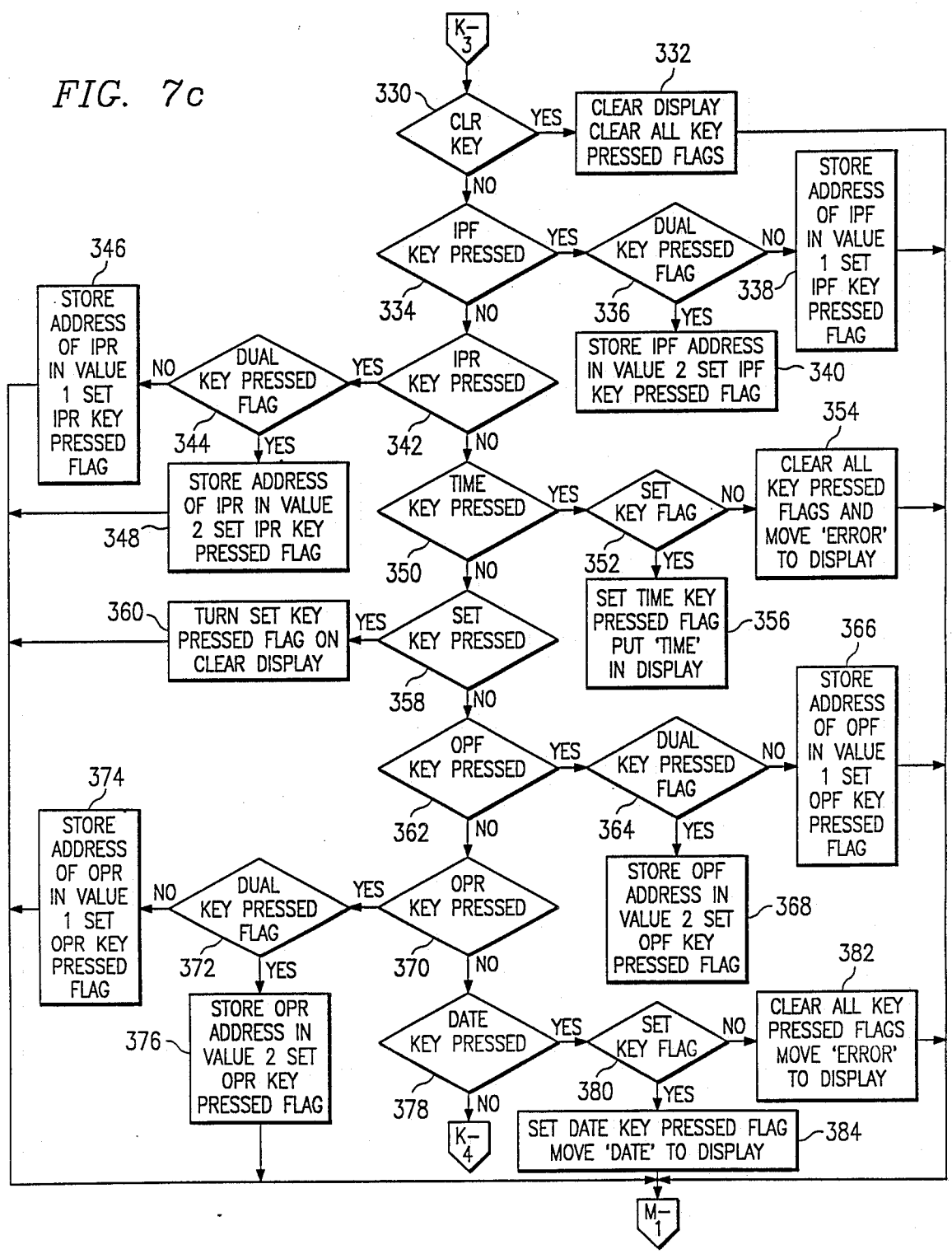
Figure 7D:
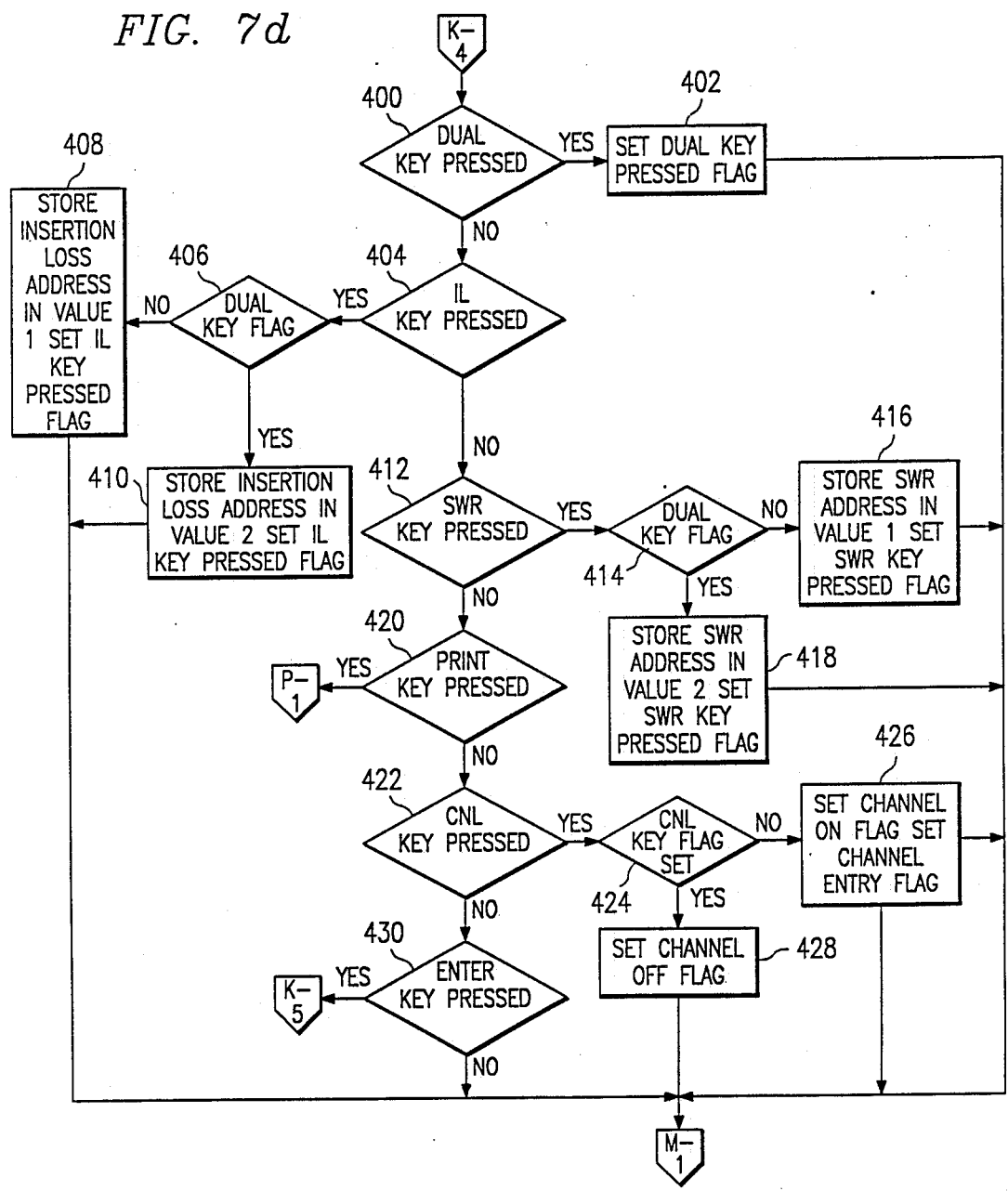
Figure 7E:
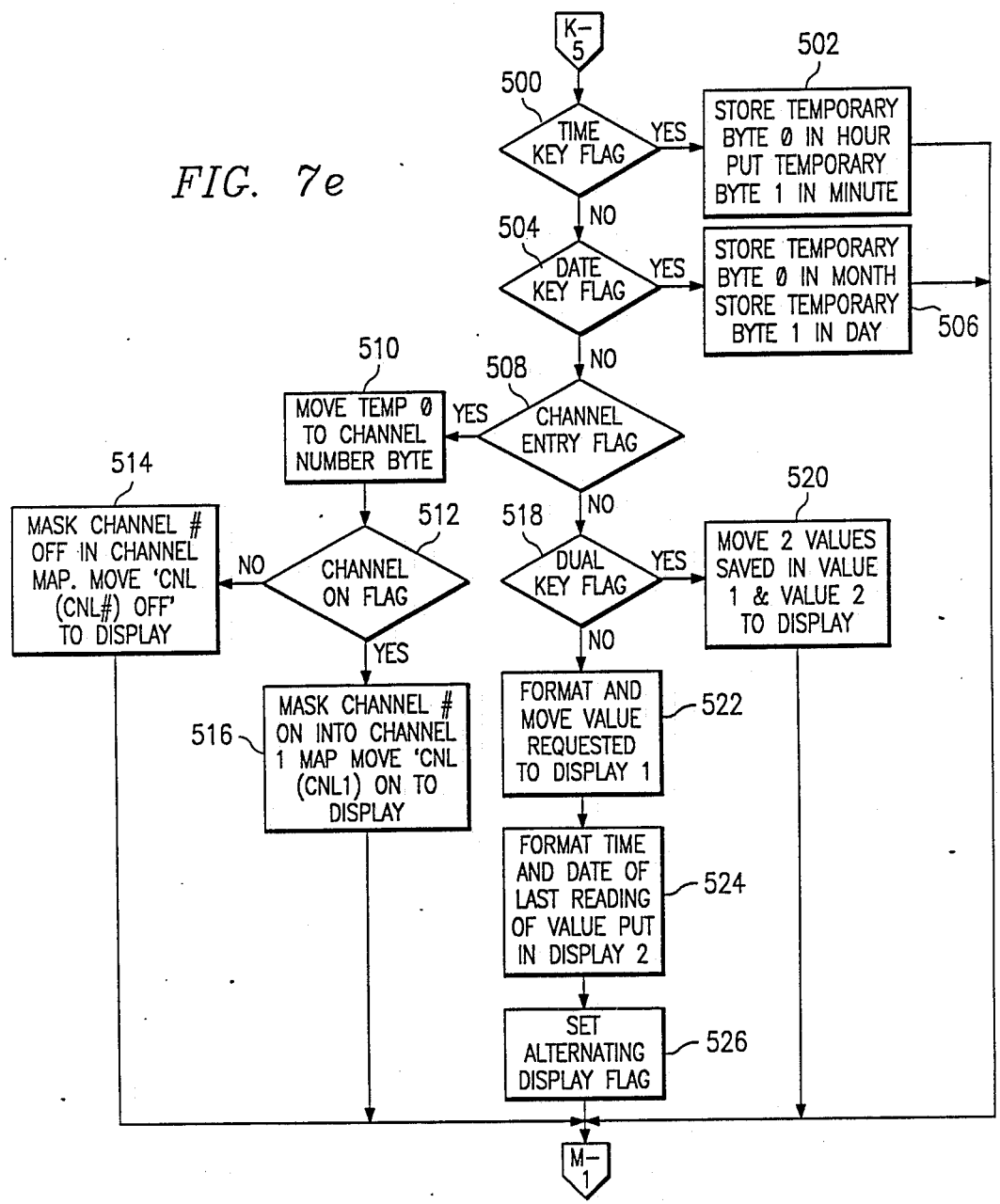

The K-3 (FIG. 7c) key routine is to determine the non-numeric key pressed from decision 314 (FIG. 7a). The K-3 routine (FIG. 7c) begins with a decision 330 whether the clear key was pressed. If true, an instruction 332 is issued to clear the display and all key flags pressed and return is made to M1 (FIG. 6a); else a decision 334 is made whether the IPF key was pressed. If the IPR key was pressed a decision 336 is made whether the flag is for a dual key pressed; if false an instruction 338 is issued to store the IPF address in value 1, set the IPF key pressed flag and return to M1 (FIG. 6a); else an instruction 340 is issued to store the IPF address in value 2, to set the IPF key pressed flag, and to return to M1 (FIG. 6a).

If the IPF key pressed decision 334 is no, a decision 342 is made whether the IPR key was pressed; if true, a decision 344 is made whether it was a dual key pressed; if false, an instruction 346 is issued to store the address of IPR in value 1, set the IPR key pressed flag, and return to M1 (FIG. 6a). If true, an instruction 348 is issued to store the address of IPR in value 2, set the IPR key pressed flag and return to M-1 (FIG. 6a).

If the IPR key pressed decision 342 was no, a decision 350 is made whether it was the time key. If true, a decision 352 is made whether the set key flag is on; if no, an instruction 354 is issued to clear all key pressed flags, display "error", and return to M1 (FIG. 6a); else, set time key pressed flag, put time in display, and return to M1 (FIG. 6a).

If the time key pressed decision 350 was no, a decision 358 is made whether the set key is pressed. If yes, an instruction 360 is issued to turn on the set key pressed flag, clear the display, and return to M-1 (FIG. 6a).

If the set key pressed decision 358 was no, a decision 362 is made whether the OPF key was pressed; if true a decision 364 is made whether the flag is a dual key pressed flag. If false, an instruction 366 is issued to store the OPF address in value 1, set the OPF key pressed flag, and return to M1 (FIG. 6a); if true an instruction 368 is issued to store the OPF address in value 2, set the OPF key pressed flag, and return to M-1 (FIG. 6a).

If the OPF key pressed decision 362 was no, a decision 370 is made whether the OPR key was pressed; if yes, a decision 372 is made whether the dual key pressed flag is on. If not, an instruction 374 is issued to store the OPR address in value 1, set OPR key pressed flag and return to M-1 (FIG. 6a); else, an instruction 376 is issued to store OPR address in value 2, set OPR key pressed flag and return to M-1 (FIG. 6a).

If the OPR key pressed decision 370 was no, a decision 378 is made whether it was the date key pressed; if yes, a decision is made whether the set key flag is on; if not, an instruction 382 is made to clear all key pressed flags, to display the error message, and return to M-1 (FIG. 1a); else, an instruction 384 is issued to set the date key pressed flag, display the date and return to M-1 (FIG. 6a).

If the date key pressed decision 370 was no, a decision 400 (FIG. 7d) is made whether the dual key was pressed; if yes, an instruction 402 is issued to set the dual key pressed flag and return to M-1 (FIG. 6a). If the dual key was not pressed, a decision 404 is made whether the insertion loss (IL) key was pressed. If yes, a decision 406 is made whether the dual key flag is on. If not, a decision 408 is issued to store the insertion loss address in value 1, set the IL key pressed flag, and return to M-1 (FIG. 6a); else an instruction 410 is issued to store the insertion loss address in value 2, set the IL key pressed flag, and return to M-1 (FIG. 6a).

If the decision 404 is that the IL key was not pressed a decision 412 is made whether the SWR key was pressed; if yes, a decision 414 is made whether the dual key flag is on. If not, an instruction 416 is made to store SWR address in value 1, set the SWR key pressed flag and return to M-1 (FIG. 6a); else an instruction 418 is issued to store SWR address in value 2, set SWR key pressed flag and return to M-1 (FIG. 6a).

If the SWR key pressed decision 412 was no, a decision 420 is made whether the print key was pressed; if yes, the print subroutine (FIGS. 9a and 9b) is entered; else a decision 422 is made whether the channel key was pressed. If true, a decision 424 is made whether the channel key flag is set. If no, an instruction 426 is issued to set channel on flag, set channel entry flag, and return to M-1 (FIG. 6a); else, an instruction 428 is issued to set channel off flag, and return to M-1 (FIG. 6a).

If the decision 422 is that the channel key was not pressed, a decision 430 is made whether the enter key was pressed; if not, return is made to M-1 (FIG. 6a); if yes, a decision 500 (FIG. 7e) is made whether the time key flag is on. If yes, an instruction 502 is issued to store temporary byte zero in hour, put temporary byte 1 in minute and return the M-1 (FIG. 7e); else a decision 504 is made whether the date key flag is on. If yes, an instruction 506 is issued to store temporary byte zero in month, store temporary byte one in day, and exit to M-1 (FIG. 6a); else a decision 508 is made whether the channel entry flag is on. If true, an instruction 510 is issued to move temporary zero to channel number byte; else, a decision 512 is made whether the channel on flag is set. If yes, an instruction 514 is issued to mask channel number off in channel map; move channel off to display, and return M1 (FIG. 6a); else, an instruction 516 is issued to mark channel number on into the channel map, display channel on and return to M-1 (FIG. 6a).

If the dual key flag is not on, instructions 522, 524 and 526 are issued, respectively, to format and move value requested to display 1; format time and date of last reading of value for display in display 2; to set alternating display flag; and return to M-1 (FIG. 6a).

CATHODE RAY TUBE SUBROUTINE

The CRT subroutine (FIGS. 8a and 8b) entered into when the decision 164 (FIG. 6a) and 274 (FIG. 6h), respectively, that CRT commands are available from the CRT are true is now described. The CRT subroutine starts with a decision 550 being made whether the escape key is pressed. If no, the process proceeds to decision 554 as to whether the carriage has been returned; else, an instruction 552 is issued to clear the CRT buffer, and set the input/output (I/O) pointers to zero before proceeding to the carriage return decision 554.

If the carriage return decision 554 is no, a decision 556 is made whether the back space character key is pressed. If true, an instruction 558 is issued to decrement buffer input pointer and return; else, an instruction 560 is issued to store the character in the buffer, increment the buffer input pointer, and return.

However, if the carriage return decision 554 is true, an instruction 562 is issued to initialize the buffer I/O pointers to zero.

Next, a decision 564 is made whether buffer (1) is numeric; if true, an instruction 566 is issued to add buffer (1) to 10 buffer (0), store in channel index, set output pointer to three and proceed to decision 576 whether buffer (X) equal space; else a decision 568 is made whether buffer (0) is numeric. If no, a decision 570 is made whether buffer (0) is a print. If no, an instruction 572 is issued to clear print buffer and pointers and return; else the print subroutine (FIGS. 9a-9c) is entered.

If the buffer (0) numeric decision 568 is yes, an instruction 574 is issued to store buffer (0) in channel, and set index output pointer to 2, before the decision 576 is made whether the buffer (X) is a space. If decision 576 is true, an instruction 578 is issued to increment output pointer and return to decision 576; else, if no, an instruction 580 is issued to compare buffer (X) -buffer (X+2) to command JWP table.

Next, a decision 582 (FIG. 8b) is made whether the command is report OPR command; if yes, an instruction 584 is issued to send chanel number, "OPR", OPR value, time and date to the CRT for display, and proceed to instruction 606 to clear the CRT buffer to spaces and clear I/O pointers; else, a decision 586 is made whether the command is to report OPF. If yes, an instruction 588 is issued to send the channel number, "OPF", OPF value, time and date to CRT for display and proceed to the celar instruction 606; else, a decision 590 is made whether the command is a report IPR command.

If decision 590 is that the command is a report command, an instruction 592 is issued to send the channel number, "IPR", IPR value, time and date to the CRT for display and proceed to the clear instruction 606; else, a decision 594 is made whether the command is to report IPF. If true, an instruction 596 is issued to send the channel number, "IPF", IPF value, time and date to the CRT for display and proceed to the clear instruction 606; else a decision 598 is made whether the command is to report the insertion loss.

If the command is a report command, an instruction 600 is issued to send the channel number, "IL", IL value, time and date to CRT for display and proceed to clear instruction 606; else a decision 602 is made whether the command is to report SWR value. If true, an instruction 604 is issued to send the channel number, "SWR", SWR value, time and date of reading to the CRT for display and proceed to the clear instruction 606; else proceed directly to the clear instruction 606 and return.

PRINT SUBROUTINE

Finally, the print subroutine which is entered into when decisions 264 (FIG. 6h), 420 (FIG. 7d), and 570 (FIG. 8a) are positive will be described. At start instructions 650, 652, and 654 are issued, respectively, to put "printing" into display and clear print buffer to spaces; move "status report" to buffer, output buffer and clear buffer; and move current time and date to buffer, output buffer and clear buffer.

Then a decision 656 is made whether the intermode flag is on; if no, a decision 660 is made whether the SWR alarm flag is on; else an instruction 658 is issued to move "TRNSMTR INTER MD" and channels on when intermode is detected and time and date moved to buffer, and then output from buffer.

If the decision 660 is no, a decision 664 is made the correct SWR alarm flag is on; else, an instruction 662 is issued to move "ANT SWR ALM" and time and date of alarm to buffer, output the buffer, clear the buffer, and proceed to the COR SWR alarm flag decision 664.

Figures 9A, 9B:
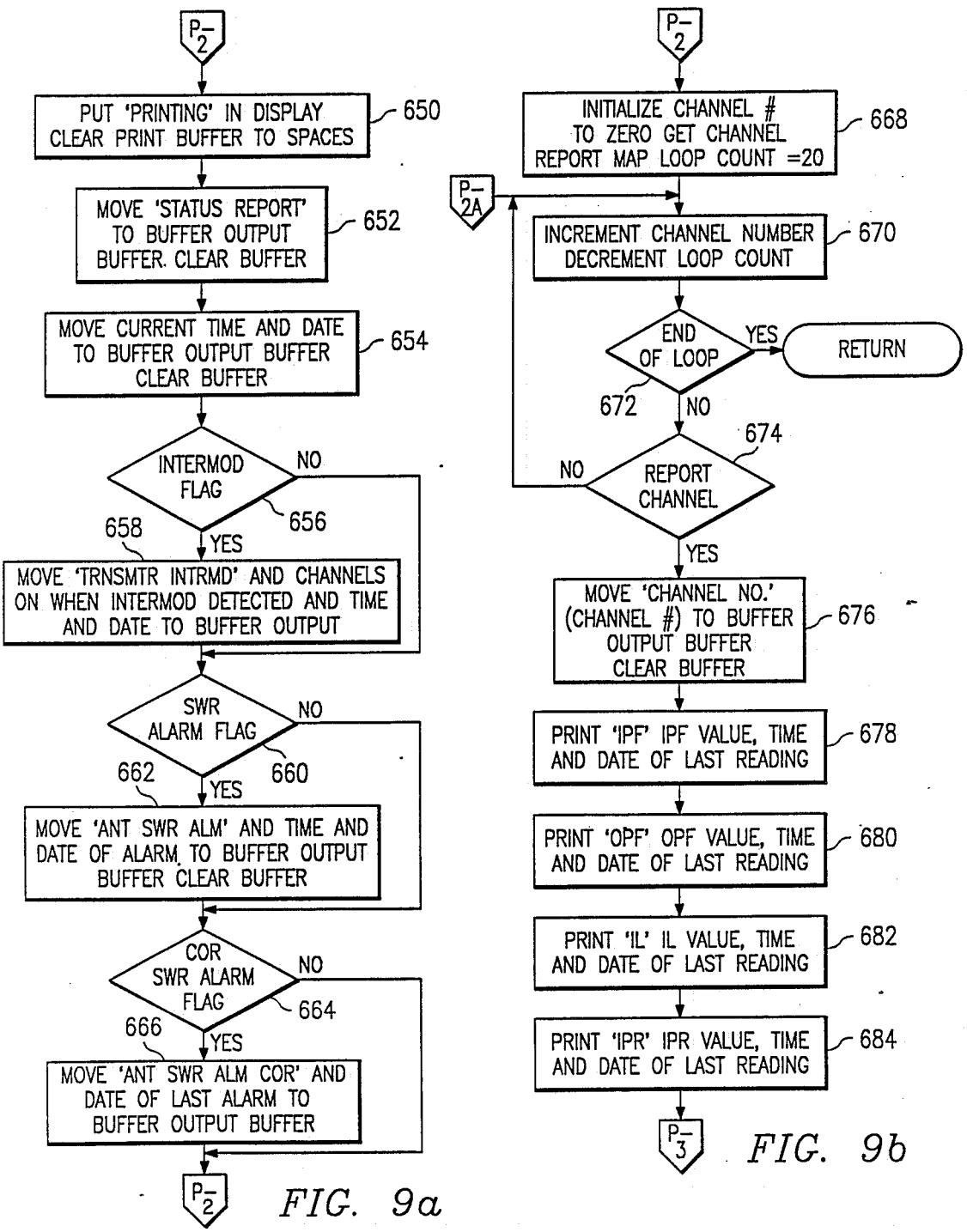
FIGS. 9a–9c are printer processing flowcharts for the power monitor of the present invention.
Figure 9C:
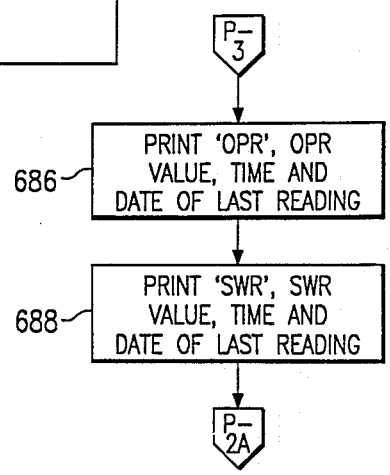

If decision 664 is true then an instruction 666 is issued to move "ANT SWR ALM COR" and time and date of last alarm to buffer, output buffer, and proceed to instruction 668; else go to instruction 668 (FIG. 9b).

Instruction 668 is issued to initialize channel number to zero, get the channel report map and set loop count to twenty. Then an instruction 670 is issued to increment channel number, and decrement loop count.

Next, a decision 672 is made whether the end of the loop has been reached. If yes, return is made; else a decision 674 is made whether the channel is a report channel. If no, return is made to instruction 670; if yes, a series of instructions 676, 678, 680, 682, 684, 686, and 688 are issued and return is made to instruction 670 and the process repeated until the end of loop is reached. Instruction 676 is to move the channel number to buffer, output the buffer, and clear the buffer. Instruction 678 is to print "IPF", IPF value, time and date of last reading. Instruction 380 is to print "OPF", OPF value, time and date of last reading. Instruction 682 is to print "IL", IL value, time and date of last reading. Instruction 684 is to print "IPR", IPR value, time and date of last reading. Instruction 686 (FIG. 9c) is to print "OPR", OPR value, time and date of last reading. Finally, instruction 688 is to print "SWR", SWR value, time and date of last reading.

Figure 10:
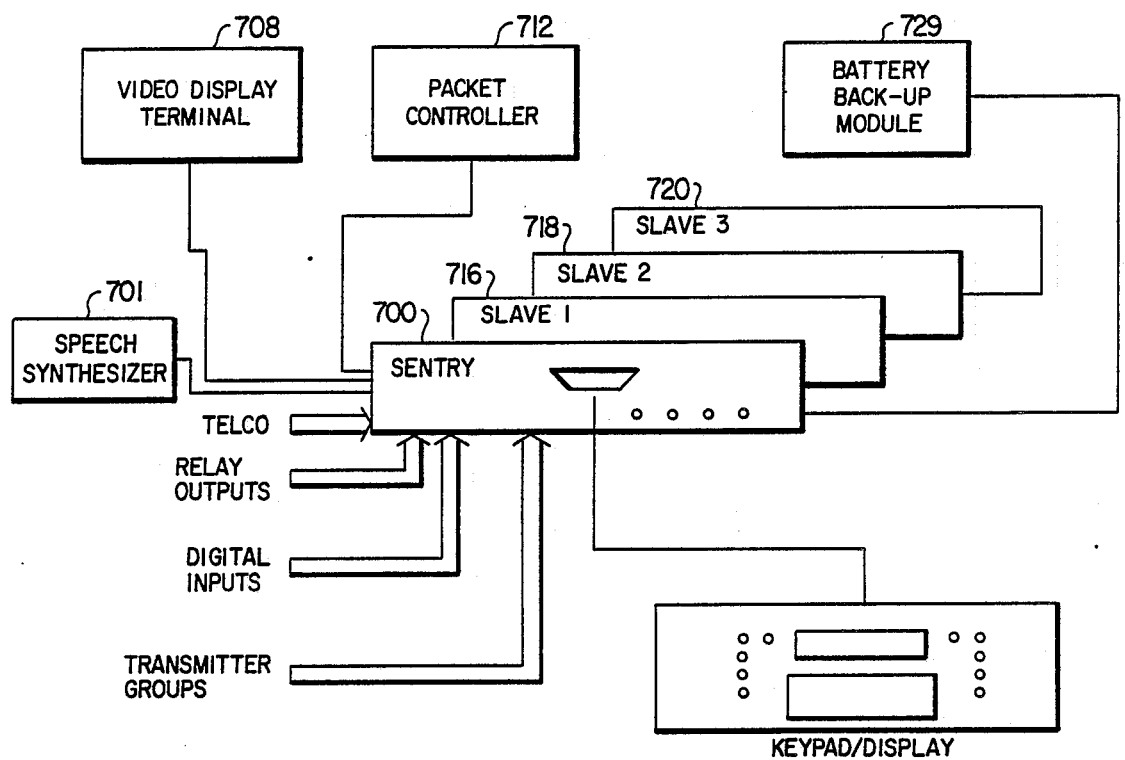
FIG. 10 is a diagram of modules and input/output connections of the monitor of FIGS. 10.

Referring now to FIG. 10, in a second embodiment of the computer controlled electronic system monitor, the microprocessor controlled system is an expandable system adapted to measure, report and control user selected parameters of the base system. The measurements may be analog or digital for representing, for example, power level, SWR, insertion loss, temperature, intrusion, fire and tower light conditions. Following each measurement, the monitor compares the data against a preset limit value for that parameter and takes appropriate action pursuant to unfavorable comparisons as follows: alarming the operator via a programmed wireline (telephone) or radio link by voice or data, or taking predetermined remedial action on-site, e.g. closing or opening relay contacts as appropriate to remedy or alleviate problems existing in the system. Further, each monitor is adapted to receive a portable keyboard/display device; this feature reduces the cost of the monitor system as the portable keyboard display device may be carried from monitor to monitor for accessing each of a plurality of monitor units.

The monitor system 10 of the second embodiment includes a master unit 700 (FIG. 10). The master unit 700 includes a central processor having the usual storage registers, an automatic logic unit, and operating programs including alarm message. A speech synthesizer 701 is connected to the center processor for producing audio versions of the desired message pursuant to information received from the central processor unit for automatic transmission by telephone or radio to personnel having a need to know.

A logic circuit (FIG. 14) which may be implemented in software or hardware monitors selected conditions and outputs an action signal to a remedial device when received signals indicate a remedial action is required. For example, the inside temperature of a transmitter containing building may be too high for a transmitter operating at 1,000 watts power even with the transmitter's cooling fan on. Thus, a four input terminal AND gate of a plurality of AND gates 770-776 (FIG. 14) can have its input terminals connected to (1) a building temperature sensor for determining the inside temperature of the building, (2) a transmitter on/off relay to determine if the transmitter in the building is on, (3) a 100 or 1,000 watt power selection switch to determine the selection switch position, and (4) a transmitter fan on/off relay to determine if the transmitter fan is on. When sensor signals are received indicating the building temperature is above the desired transmitter operating temperature, the transmitter is on, the transmitter is operating at 1,000 watts, and the transmitter fan is on, the software logic causes an output signal to turn on the building's air conditioner to cool the environment temperature of the transmitter. While this is a practical application, it is only one example of the many applications available using the software logic. When more than one "AND" gate function is included for more than one building transmitter, the AND gates are connected to an OR gate 778. The OR gate is responsive to an input from any AND gate to output a signal indicative thereof to actuate the remedial device.

Figure 11:
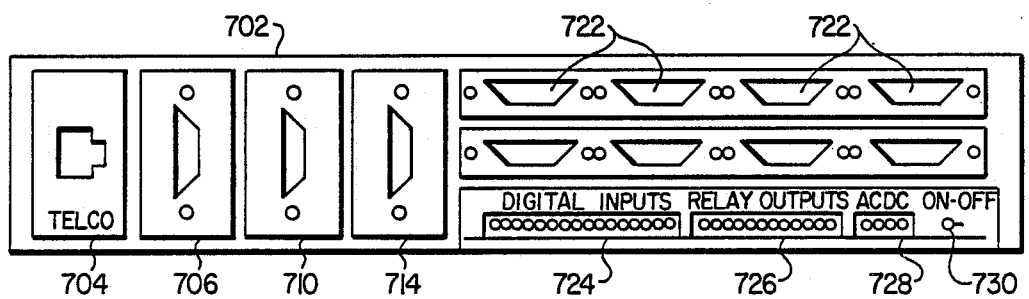
FIG. 11 is a diagram of modules and input/output connections of the monitor of FIG. 10.

The master unit 700 also has a combined connector panel/terminal board 702 (FIG. 11). The connector panel has a plurality of input/output connectors including a connector 704 for a telephone module for telephone communications with the master unit 702, a connector 706 for connecting an on-site video display terminal module (FIG. 10), a connector 710 (FIG. 11) for a packet controller module 712 (FIG. 10) and a connector 714 (FIG. 11) module for on-site expansion of up to 32 separate 25 pin ports for a plurality of slave units 716, 718, and 720. While the terminal portion of the panel/terminal board provides a plurality of connectors including: connectors 772 for 8 transmitter groups (TG1-TG8) having pin connections as shown in Appendix I; connectors 724 for external connection to 8 digital inputs; connectors 726 for four form C relays; and connector 728 for connecting either ac or alternative dc power. The dc power is provided by a battery backup module. An on/off switch 730 completes the elements on the combined connector panel/terminal board 702.

The telephone communication module has the standard 300/1200 band transfer rate for communication with other on-line computers and telephones. The form C relay outputs are for C (common), NC (normally closed), and NO (normally open) functions. Each transmitter group of the eight transmitter groups includes 4 analog inputs, 2 digital inputs, a form C relay output, a relay driver output, and a balanced audio channnel. And, each slave unit duplicates the I/O capability of the master unit.

Figure 12:
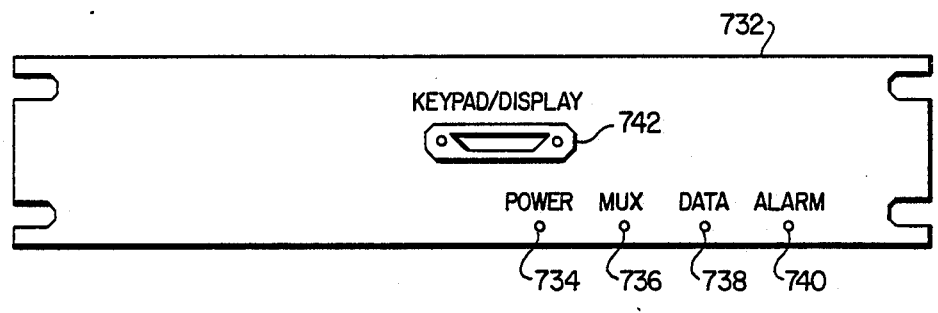
FIG. 12 is a view of the front panel of the monitor of FIG. 10.

A front panel 732 (FIG. 12) for the master unit includes four light emitting diodes (LEDs). A green power LED 734 displays continuously when power (ac or dc) is applied to the master unit 700. A blinking green LED 736 is applied to indicate that the processor is operating and multiplexing all inputs to the master unit 700 for information. A yellow LED 738 is used to indicate that data is being transferred to or accessed from the master unit 700. A red LED 740 is used to indicate an alarm that exists on one of the alarm inputs. A keypad/display connector 742 for a portable keyboard/display device completes the front panel 732. The detachable keyboard/display device reduces the system cost by allowing the use of one such device for accessing and entering information into several master units.

Figure 13:
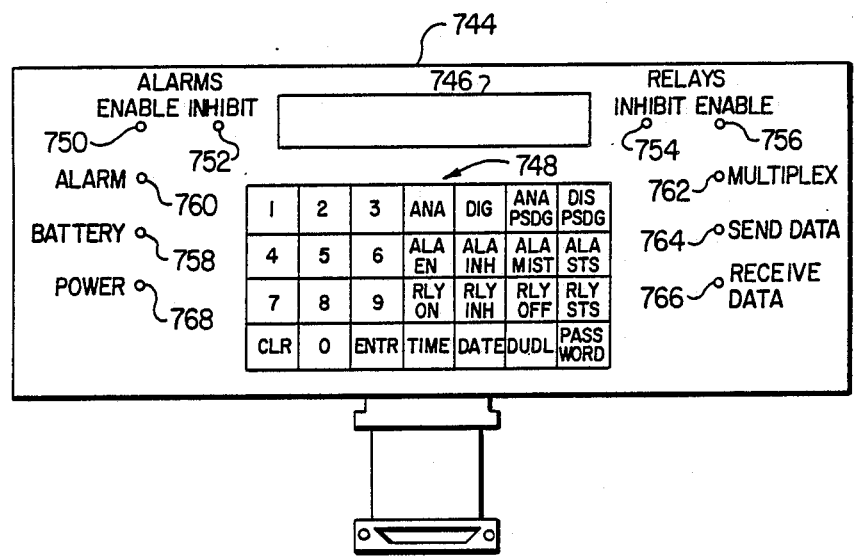
FIG. 13 is a front view of a detachable display and keyboard for the monitor of FIG. 10.

Referring now to FIG. 13, the keboard and display 742 includes a 16 character alphanumeric liquid crystal display 746, a 28 key keyboard 748 and a plurality of status LEDs. The status LEDs include alarm enabled and inhibited LEDs 750 and 752, relay enable and inhibit LEDs 758, a general alarm indicating LED 760, a multiplex (MUX) progression of input indicating LED 762, an internal modem sending data (send data) indicating LED 764, an internal modem receiving data (receive data) indicating LED 766. And a power on indicating LED 768.

The portable keyboard/display 744 provides for on site interrogation and interpretation of data relating to alarms, relays, on site measurements, miscellaneous data, and remote data transfer for input and output channels of a plurality of master unit stations.

The 28 keys of the keyboard includes a 3×4 block of keys 1, 2, 3, ... 0 for numeric entry and to access information, a CLR (clear) key and an ENTR (enter) key. The clear key and the enter key are provided for clearing the keyboard of all information before it is entered in the processor, and for entering keyboard punched instructions for storage, respectively. In a first (top row) of four rows of keys: an ANA (analog) key is provided for displaying the measured value of a selected channel in selected terms (Watts, Celsius, Fahrenheit, Volts, Amps); a DIG (digital) key is provided for displaying the status of a selected channel; an ANA/PSDO (analog pseudo) key is provided for displaying the calculated value of a selected parameter (SWR, insertion loss, etc.) for a selected channel (This function is created for performing calculations resulting from data values of two analog channels); and the last key of the first row is a DIG/PSDO (digitial pseudo) key provided for performing logic functions based on the logic states of up to 4 analog or digital channels.

In the second row, an ALM/EN (alarm enable) key is provided to enable the alarm functions on any channel by operating this key and entering the channel number; example: (ALM/EN) (CHANNEL NO.) (ENTER); also, an ALM/INH (alarm inhibit) key is provided to inhibit the alarms of any channel. An ALM/HIST (alarm history) key is provided for obtaining the alarm history of all channels for display with time and date by pressing (ALM/HIST) (ENTER). An ALM/STS (alarm status) key is provided for determining the current alarm status of all channels for display by pressing: (ALM/STS) (ENTER).

In the third row, a RLY/ON (relay on) key is provided for energizing any relay individually as follows: (RELAY/ON) (RELAY NO.) (ENTER); while a RLY/OFF (relay off) key is provided and similarly operated to denergize any relay. A RLY/INH (relay inhibit) key is provided to inhibit the operation of any relay regardless of the alarm state by pressing (RLY-/INH) (RELAY NO.) (ENTER), and a RLY/STS (relay status) key is provided for determining the status of all 80 possible relays in the system (ON, OFF, INH) by pressing (RLY/SYS) (ENTER).

In the fourth row, TIME and DATE keys are provided for setting and entering the date and time. A DUAL key is provided whereby any two parameters may be displayed; for example, to display the watts of analog channel 4 and the C of channel 3, the following keyboard sequence applies: (ANA) (0) (4) (DUAL) (ANA) (0) (3) (ENTER). The display will then show, for example: "146 WATTS 42 C". The last key is a PASS/WORD key which is provided for entering a password when a function switch on the central processing unit (CPU) is in the on position. The password is entered by pressing (PASSWORD) (4 characters) (ENTER).

The keyboard has three possible functional sequences: the first sequence is (FUNCTION) (CHANNEL NO.) (ENTER) to enter input information, analog, digital, alarm or relay information; the second sequence is (FUNCTION) (ENTER) to enter general information, time, date information; and the third sequence is (FUNCTION) (XXXX) (ENTER) to enter command, relay inhibit, alarm inhibit, etc.

Thus, the master unit 700 is programmed to provide for system measurements that are easily accessible, convenient, comprehensive, accurate, recordable and diversified. Further, the software provides control by means of remote intervention. Finally, the software supervises system performance in that performance outside acceptable parameters is promptly reported for local or remote intervention.

To this end, inputs to the master unit 700 include analog (AI), analog pseudo (AP), digital (DI), pseudo digital (DP), and miscellaneous operational characteristics.

The analog inputs (AI) to the master unit include eleven different types of analog inputs that may be specified and labeled by the user on setup. One may be selected for each analog input. The possible channel types are: 100 and 1000 Watt transmitter sensors; 100 and 1000 Watt antenna sensors; linear voltage input (with scale factor); degrees Fahrenheit (F) temperature; degrees Celsius (C) temperature; and four separate user defined value conversions. The master unit has a capacity of 128 of any combination of the above analog inputs, four per input port.

The analog pseudo channels (AP) are created for performing calculations resulting form the data value of two channels. For example, the SWR and insertion losses are calculated based on the data values of two separate inputs. Other channel types includes: A+B; A−B; A * B, A * B/10,000; A/B; and A/B * 10,000.

The digital input (DI) channels include two digital inputs per input port and eight miscellaneous digital inputs per box. The fully expanded master unit can provide as many as 96 digital inputs. All the digital inputs are completely diversified and may be specified and labeled by the user. The digital channels may be, for example, programmed for: delay; "and'ing" or "or'ing" with any other channels to produce a result; timing activity or inactivity; specifing active high or active low; presenting an alarm state; being inhibited; and operating any 1 of 80 relays. In addition, the digital channels may be used to create the complex logic functions (FIG. 14) for error checking the operation of system's subsystems.

The digital pseudo (DP) channels are for the purpose of performing logic functions based on the logic status of up to four digital channels. This allows the user to create logic functions of the following complexity:

$$(ABCD) + (EFGH) + (IJKL) + (MNOP)$$

Figure 14:
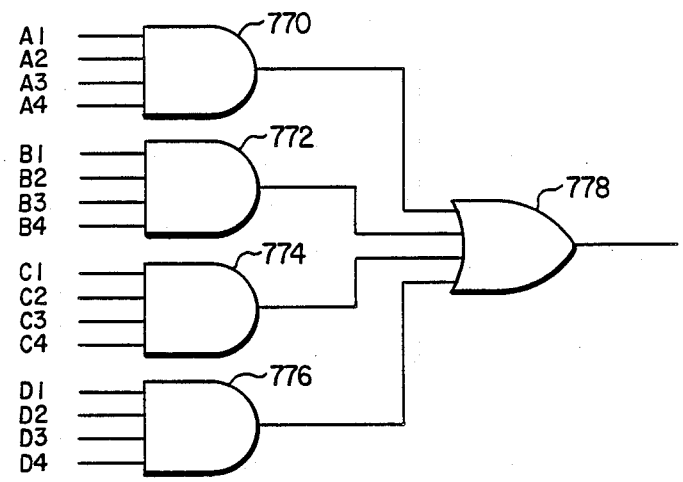
FIG. 14 is a logic diagram for the digital pseudo channels logic functions based on 4 digital channels.

FIG. 14 as previously described demonstrates this logic.

The miscellaneous input operational characteristics of an input channel (analog or digital) are programmable; thus, at any moment an input channel may be placed in an enabled or disabled state. When enabled, all channels read in real time. When disabled, the inputs will read the last reading at the time of disable with time and date. Digital pseudo channels cannot be disabled. The decision to enable or disable a channel is made dynamically by the unit in response to user programmed inputs.

The master unit's medium for communication and data exchange, alarms, reports and control commands is by: wireline (telephone) (PSTN); radio link; DTMF (dual tone multifunction) control, and voice synthesis techniques. Structures for accomplishing these functions are well known in the art; thus, a detailed description of their implementation is not included.

OPERATION

Figure 15A:
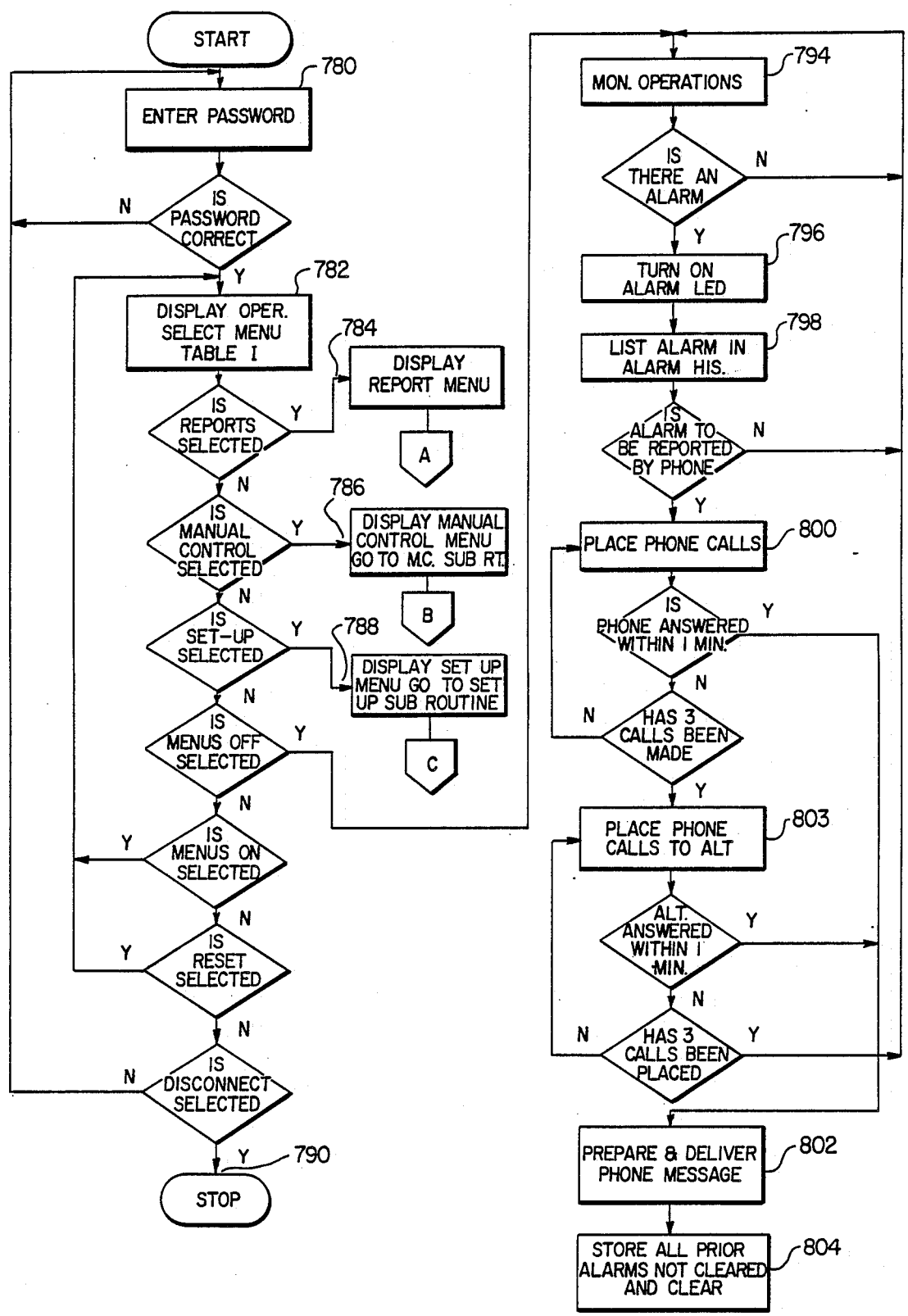
FIGS. 15a–15d constitute an operation flowchart for the monitor constituting the second embodiment.

The operation of the second embodiment is as follows. At turn on an instruction 780 (FIG. 15a) is issued to display a password prompt and the password is entered either by a remote or local keypad means. Correct entry of the password is necessary to be connected on line with the master unit from a remote location. Following entry of the password the user may type a comma followed by "binary" or "no menu". If "binary" is typed, communication will be assumed to be from machine to machine with some error checking. No menu suggests an experienced user and the master unit will prepare for basic commands without initial prompt. If the words "no menu" or "binary" do not appear after the correct password entry, an instruction 782 is issued to display an operation select menu together with the prompt "ENTER SELECTION". The operation select menu is set forth in Table 1.

TABLE 1

|  | MNEMONICS |
|---|---|
| 1. REPORTS | (REPORT) |
| 2. MANUAL CONTROL | (MANUAL) |
| 3. SET-UP | (SETUP) |
| 4. MENUS OFF | (NOMENU) |
| 5. MENUS ON | (MENU) |
| 6. DISCONNECT | (DISCON) |
| 7. RESET *WARNING FOR EMERGENCY ONLY* | (RESET) |

Mnemonics do not appear on the screen.

Selection of the report, manual control and setup operations causes instructions 784, 786 and 788 to be issued to call up other menus set forth in Tables 2-4. A reset selection results in a return to start for a new power-up cycle and should be used only for emergency. While selection of disconnect enables an instruction 790 to issue to terminate communications.

Selection from the menu may be made by pressing the number corresponding to the desired operation or by typing the mnemonic. Mnemonics may be entered at any time in the program to call a particular menu or issue a command, even from another menu.

TABLE 2

| REPORTS | MNEMONICS |
|---|---|
| 1. CURRENT ALARMS | (ALARMS) |
| 2. ALARM HISTORY | (ALMHST) |
| 3. CURRENT STATUS | (STATUS) |
| 4. RELAY OUTPUTS | (RLYOUT) |
| 5. CHANNEL MONITOR | (MONITOR) |
| 6. CHANNEL ON TIMERS (1-12 HOURS) | (CNLTM1) |
| 7. CHANNEL ON TIMERS (13-24 HOURS) | (CNLTM2) |
| 8. RETURN TO OPERATION SELECT MENU ENTER SELECTION | (MENU) |

The reports available for selection are described hereinafter.

TABLE 3

| MANUAL CONTROL SELECTION MENU |  |
|---|---|
|  | MNEMONICS |
| 1. RELAY ON | (RLYON) |
| 2. RELAY OFF | (RLYOFF) |
| 3. INHIBIT ALARM | (INHALM) |
| 4. ENABLE ALARM | (ENAALM) |
| 5. INHIBIT RELAY | (INHRLY) |
| 6. ENABLE RELAY | (ENARLY) |
| 7. ALARM RESET | (CALM) |
| 8. ALARM HISTORY RESET | (CALH) |
| 9. RETURN TO OPERATION SELECT MENU ENTER SELECTION | (MENU) |

TABLE 4

| SET-UP SELECTION MENU |  |
|---|---|
|  | MNEMONICS |
| 1. SITE DATA | [SITE] |
| 2. ANALOG INPUT CHANNEL | [ANLGIN] |
| 3. DIGITAL INPUT CHANNEL | [DIGIN] |
| 4. ANALOG PSDO CHANNEL | [ANLGPS] |
| 5. DIGITAL PSDO CHANNEL | [DIGPS] |
| 6. RELAY OUTPUTS | [RELAY] |
| 7. INPUT CONVERSION TABLE | [ITABLE] |
| 8. ERASE ALL PROGRAMMING | [ERASE] |
| 9. RETURN TO OPERATION SELECT MENU ENTER SELECTION | [MENU] |

Also at startup, the master unit pursuant to an instruction 794 continuously monitors the system for signals indicating operation below prescribed parameters. Upon an occurrence of an alarm not previously reported instructions 796 and 798 are issued to turn on the alarm LED and enter alarm in history memory. If the alarm is to be reported by telephone an instruction 800 is issued for the master unit to place up to four phone calls to, for example, a computer or terminal, a maintenance technician, an emergency department (fire, flood) and/or a security department.

If the phone call is answered within one of three one minute ringing periods an instruction 802 is issued to transmit an alarm message through the 300 or 1200 baud MODEMs or packet MODEM as appropriate in a format as follows:

| Pending Alarms | | | | | | |
|---|---|---|---|---|---|---|
| SITE: | | | | | | |
| Time: _____ , | | Date: _____ | | | | |
| UNIT | CHANNEL | DESCRIPTION | VALUE | TYPE(S) | TIME | DATE |
| 12AB | A1001 | XXXXXXXXX | −100YY | DNHL | 1200 | 12/31 |

The title "Pending Alarms" is self-explanatory. The "Site" is a 16 character user programmable word. The "Time" and "Date" are the current time and date information. The "Unit" is a 4 digit alphanumeric, user programmable word. The "Channel" is designated alphanumerically using mnemonics as follows: AI for Analog Input; DI for Digital Input; AP for Analog Pseudo; DP for Digital Pseudo; and digits for the channel address.

Analog channels are numbered 1 through 128. Port 1 analog channels are numbered 1 to 4. Digital channels are numbered 1–96. Port 1 digital channels are numbered 1 and 2. Analog pseudo channels are numbered 1–128. Digital pseudo channels are numbered 1–64. An example of a channel assignment (TXG1–TXG4) is shown in Appendix 1.

To continue the message description, the "Description" is a 16 alphanumeric character word which is user defined. The "Value" for analog uses a minus sign together with six digits with floating decimal point. This value is in watts, C, F, or use defined units such as volts or distance, for example. The "YY" is a seven character field for Watts, C, F, or use defined units such as volts or distance, for example. The "YY" is a seven character field for Watts, C, F, or volts, for example. The "Types" is for the type of alarm existing. Possible types are: D-debounced digital alarm; N-non-debounced digital alarm; H-high; and L-low. The "Time" is the time the alarm occurred; and the "Date" is the date the alarm occurred.

Figure 15B:
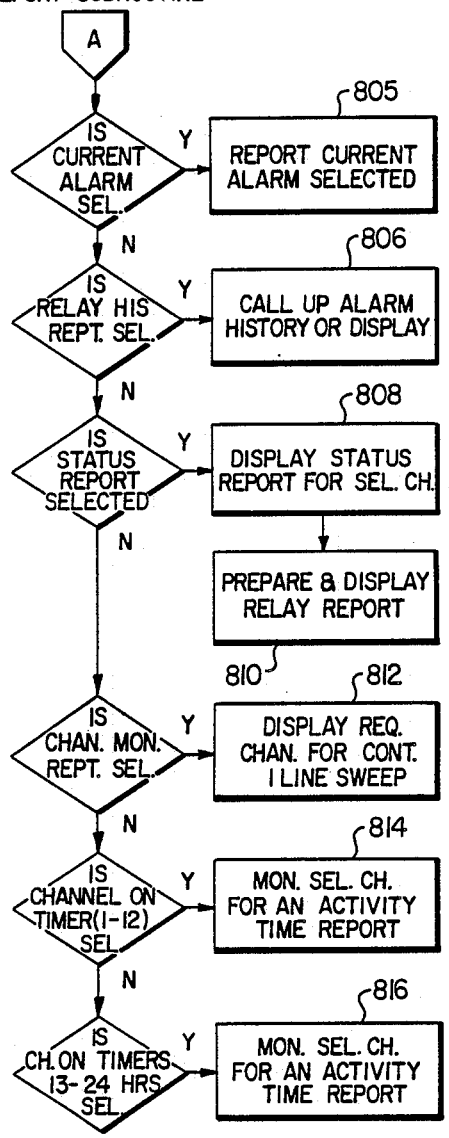
Figure 15C:
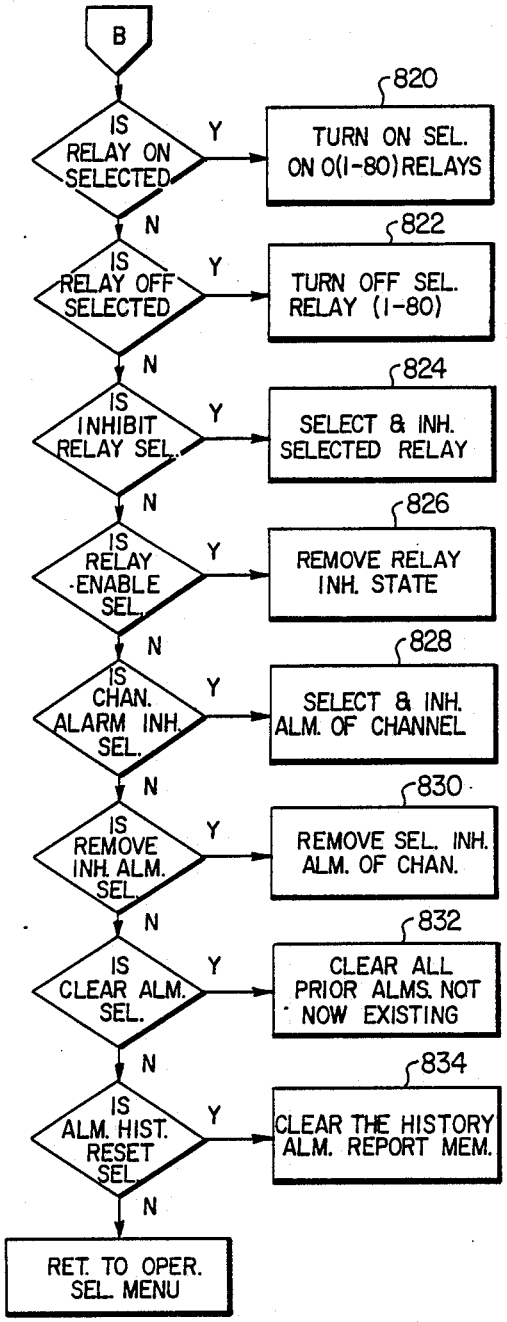

If the phone is not answered after the three calls are made, an instruction 803 is issued to repeat the phone call sequence using the telephone numbers of designated alternates. If no phone call is completed an instruction 804 is issued to store the call message for reporting during any subsequent alarm call or under the Reports menu. If a decision is made that the current alarms report has been selected an instruction 805 (FIG. 15b) is issued to report all alarms that have not previously been cleared. The alarms are cleared by entering the command "CALM". Alarm information is shown in order of unit number then by analog, digital, analog pseudo, digital pseudo in increasing numerical order.

An alarm report may be called for at any time by entering ALARMS (CR).

REPORTS

The master unit open selection generates six separate reports: (1) current alarms; (2) alarm history; (3) status; (4) relay status; (5) channel monitor; (6) channel-on timer (1–12 hours); and (7) channel-on-timer (13–24 hours).

ALARM HISTORY REPORT

Upon the occurrence of each alarm, the instruction 804 is issued to also list the alarm in an Alarm History Report memory. Thus, the alarms are listed in chronological order as they occur. The Alarm History Report is formatted exactly as the Pending Alarm Report described above; thus, no further description is necessary. The Alarm History Report may be called for at any time by entering ALMHST (CR) to have issued an instruction 806 for an Alarm History Report.

STATUS REPORT

Upon entry of STATUS(CR) an instruction 808 is issued to display a status report in a format as follows:

| STATUS REPORT | | | | | | | | |
|---|---|---|---|---|---|---|---|---|
| SITE: | | | | | | | | |
| TIME: _____ | | | | DATE: _____ | | | | |
| UNIT | CHNL | DESCRIPTION | ALARMS | INH | VALUE | HVALUE | LVALUE | AVALUE |

The explanation of the Status Report's title, site, time, date, unit, channel, description, alarms (types), and values are as explained for the alarms report format. However, the INH (inhibit) inhibits all alarm activity for a particular channel, and the HVALUE, LVALUE, and AVALUE refer, respectively, to the highest value measured on that channel for the previous day, the lowest value measured on that channel for the previous day, and the average value measured on that channel for the previous day.

Data will only appear in the alarms column if an alarm exists. If neither DNH or L is shown, no alarms are present. The ordering of information is the same as for the alarms report, and the status report can be called at any time by entering STATUS (CR).

RELAY REPORT

When a request for a status report is entered or when a status report is sent automatically by the master unit, an instruction 810 is issued to prepare and display a relay report in a format as follows:

| RELAY REPORT | | | | |
|---|---|---|---|---|
| SITE: | | | | |
| TIME: | | DATE: | | |
| CHANNEL | DESCRIPTION | VALUE | INHIBIT | TIMEOUT |
| RY01 | XXXXXXXXX | ON/OFF | Y/N | 10,000 |

The title is self-explanatory and the site, time and date and description are the same as alarm and status reports: however, the channel RY01 refers to relay No. 1. Relays are numbered 1-80. Each port has one relay for control and one relay driver, numbered 2 and 1 respectively. The four miscellaneous relays on the outside terminal block of the master units are numbered 17, 18, 19, and 20. The value ON or OFF designates whether the relay is energized or deenergized. The inhibit YES or NO indicates whether the relay is inhibited. If inhibited, the relay is taken out of automatic alarm control. The relay can then be manually manipulated remotely. The timeout value shows the seconds remaining for the relay to be in the on state. Existing numbers show that the relay on-time is being counted down.

CHANNEL MONITOR REPORT

Upon entry of MONITOR, an instruction 812 is issued to call up a requested channel for continuous one line swept display in a format as follows:

| CHANNEL MONITOR REPORT | | | | | | | | |
|---|---|---|---|---|---|---|---|---|
| SITE: | | | | | | | | |
| TIME: | | | | DATE: | | | | |
| UNIT | CHANNEL | DESCRIPTION | VALUE | ALARMS | INH | HVALUE | LVALUE | AVALUE |
| F026 | AI009 | XXXXXXXXX | −100 | DNHL | Y/N | 175 | 100 | 120 |

CHANNEL ON TIMERS

Upon entry of CNLTM1 OR CNLTM2, respectively, an instruction 814 is issued to monitor a selected channel for an activity time report. The digital pseudo channels facilitate the monitoring. The report formats are as follows:

| CHANNEL-ON TIMERS (1-12 HOURS) | | | | |
|---|---|---|---|---|
| SITE: | | | | |
| TIME: | | DATE: | | |
| CHANNEL | −1 | −2 | −3 ... | −12 |
| DP008 FSK | XXXX | XXXX | XXXX | XXXX |
| DP008 ANA | XXXX | XXXX | XXXX | XXXX |

| CHANNEL-ON TIMERS (13-24 HOURS) | | | | |
|---|---|---|---|---|
| SITE: | | | | |
| TIME: | | DATE: | | |
| CHANNEL | −13 | −14 | −15 ... | −24 |
| DP008 FSK | XXXX | XXXX | XXXX | XXXX |
| DP008 ANA | XXXX | XXXX | XXXX | XXXX |

Each hour column in the report represents the past hour and the active time in seconds. The channel time report may be called up by instruction 816 individually as with any of the reports. An example of the use of channel-on timers may be to time the total occurrence of FSK (frequency shift keying) and analog key uptime for use in monitoring the rehability of simulcast systems.

MANUAL CONTROL

Returning to the operation select menu (Table 1) and selection of manual control. Upon request for manual control an instruction 818 is issued to display the manual control selection menu. The menu is set forth in Table 5.

| TABLE 5 | |
|---|---|
| MANUAL CONTROL | |
| 1. RELAY ON | [RLYON] |
| 2. RELAY OFF | [RLYOFF] |
| 3. INHIBIT ALARM | [INHALM] |
| 4. ENABLE ALARM | [EN AALM] |
| 5. INHIBIT RELAY | [INHRLY] |
| 6. ENABLE RELAY | [ENARLY] |
| 7. ALARM RESET | [CALM] |
| 8. ALARM HISTORY RESET | [CALH] |
| 9. RETURN TO OPERATION SELECT MENU | [MENU] |

By entering RYLON or 1, (space), and number of the relay, an instruction 820 is issued to turn on a selected one of the 80 relays. When the manual control menu is on, the following type sequence will produce the same result:

1(space) number of the relay.

Similarly, any of the 80 relays in the system can be inhibited. Upon entering either RLYOFF or 2, (space), and number of the relay an instruction 822 will issue to turn off the selected relay.

By entering INHRLY or 5, (space), and a number of the relay an instruction 824 is issued to inhibit a selected one of the 80 relays in the system, i.e. taken out of automatic alarm control. Relays that are to be remotely manipulated should first be inhibited to remove the influence of a possible alarm condition activation. To remove the relay inhibited state, a command 826, ENARLY, is issued upon entering ENARLY or 6, (space), and number of relay.

An instruction 828 to inhibit an alarm of a channel is issued by entering INHALM, or 3, (space) [AI, DI, AP, DP] [CHANNEL NO.] and a command 830 to remove the inhibit alarm state from a selected channel is issued by entering ENAALM or 4, space, [AI, DI, AP, DP] and [CHANNEL NO.].

All previous alarms that do not presently exist are cleared by an instruction 832 issued when CALM (CR) or 7 is entered.

Finally, when CALH or 8 is entered, an instruction 834 is issued to clear the alarm history report. The alarm history report is capable of accumulating 512 alarms before the listing starts to roll,

SET UP

Figure 15D:
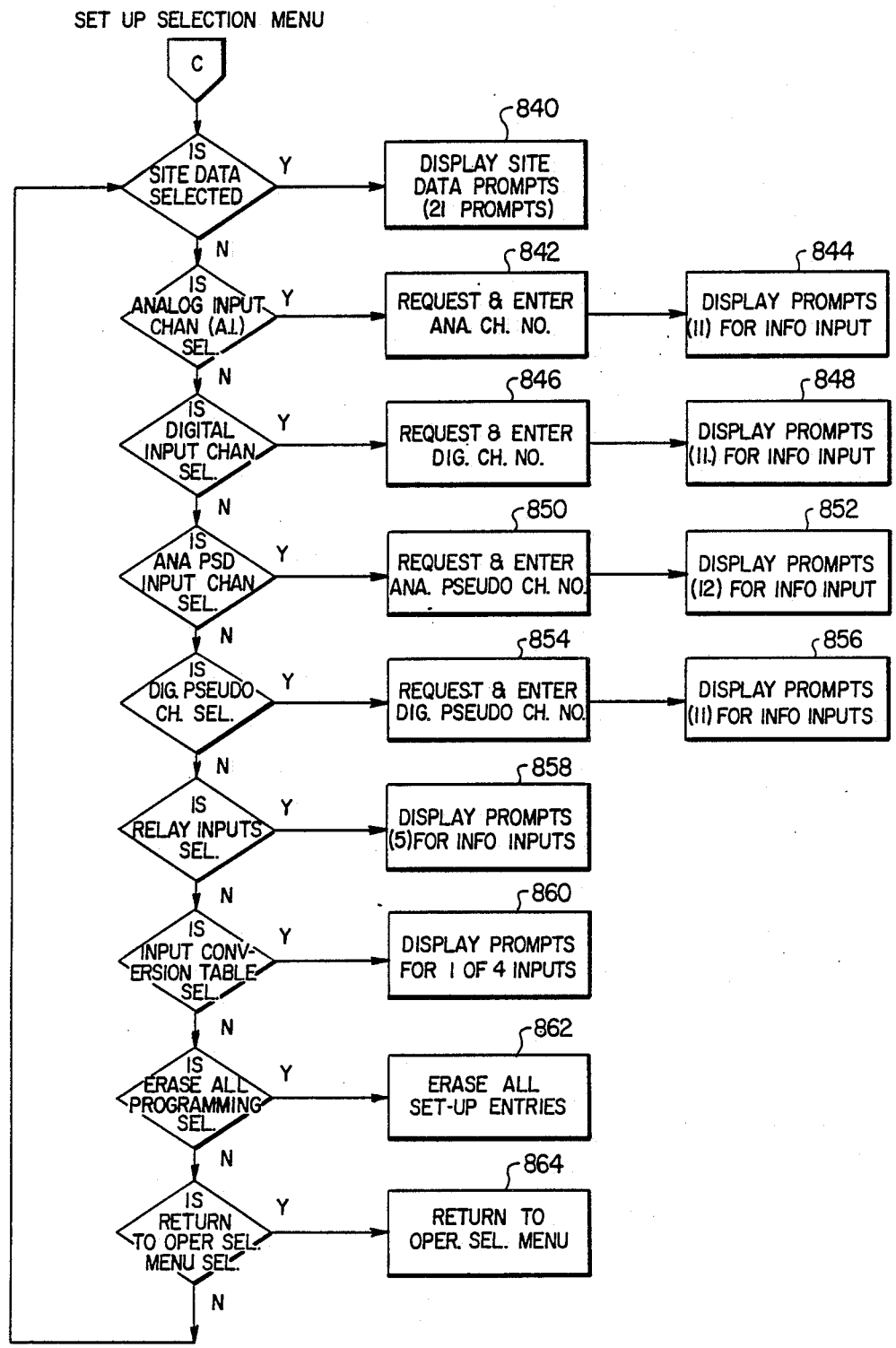

Returning to the operation select menu and setup selection. Setup is used to enter specific initialization data required for the master unit to measure and report practical information. Initial data is entered by first selecting the SETUP SELECTION MENU. Upon selecting the setup selection menu, an instruction 840 (FIG. 15d) is issued to display the Setup Selection Menu shown in Table 6.

TABLE 6

| SETUP SELECTION MENU |
| --- |
| 1. SITE DATA |
| 2. ANALOG INPUT CHANNEL |
| 3. DIGITAL INPUT CHANNEL |
| 4. ANALOG PSEUDO CHANNEL |
| 5. DIGITAL PSEUDO CHANNEL |
| 6. RELAY OUTPUTS |
| 7. INPUT CONVERSION TABLE |
| 8. ERASE ALL PROGRAMMING |
| 9. RETURN TO OPERATION SELECT MENU |
| MAKE SELECTION |

SITE DATA

Selection of 1 (SITE DATA) is made by entering SITE (CR); whereupon an instruction 840 is issued to display a site data screen which requires the entry of 21 separate lines of information as follows.
1. TIME—4 digits (24 hr. clock) no colon.
2. DATE—4 digits (no slashes).
3. YEAR—4 digits
4. SITE NAME—16 characters.
5. PASSWORD—4 characters.
6. REPORT TIME—A selected time of the day when the master unit is to report its status and relay output states. 4 digits (no colon).
7. REPORT TIME—Another selected time of day when the master unit is to report its status and relay output states. 4 digit (no colon). If no entry, there will be no report.
8,9. REPORT TIME—On entry of 4 digits for these fields, the master unit will report its status and relay output states. On no entry, there will be no report.
10. PHONE #1 PRI=
11. PHONE #1 ALT=
12. RETRY INTERNAL (minutes)=
13. —21, PHONE #2, 3, 4, and Alternatives with retry intervals for each.

Phone recipient types are A, B, C, D, or E (The types are computer or terminal at 300 (A), 1200 (B) and RF packet (C) MODEMS, voice recipient (D) and paper (E) and may be designated such as a prefix to each telephone number entered.

EXAMPLE

Entry of a phone number to a 1200 baud computer terminal with alternative to a 300 baud terminal at a retry interval of 5 minutes is as follows:
10. PHONE #1 PRI=B (up to 14 digits)
11. PHONE #1 ALT=A (up to 14 digits)
12. RETRY INTERVAL (minutes) =5

After such an entry, the instruction 800 (FIG. 15a) can issue to call all numbers that have been programmed in sequence. If no answer, the instruction 803 can issue to transfer to the alternative number. If the alternate does not answer within 3 trys, the RETRY INTERVAL will elapse before the sequence is repeated continually. If the retry interval is 0, the primary and alternative will sequence only once.

ANALOG INPUT CHANNEL

If selection 2, ANALOG INPUT CHANNEL, of the SETUP SELECTION MENU (Table 6) is made, an instruction 842 is issued to display a prompt to ask for the analog channel (AI) number. Any of the 128 analog channels may be selected at this point. The specific pinouts for each of the transmitter groups (TXG1-TXG8) are set forth in APPENDIX 1. The phrase "transmitter groups" as used herein is synonymous with the word "port" also used in this description. When the analog channel number is entered, an instruction 844 is issued to display 11 separate line requests for information as follows:
Enter Channel Number: 1
   Analog Input Channel 1
     1. Channel Type (0-11)=0
     2. Description=not programmed
     3. Unit ID=
     4. Measurement Units=
     5. Lower Alarm Limit=3247
     6. Upper Alarm Limit=3247
     7. Alarm Report Types (1, 2, 3, 4)=
     8. Alarm Relay Number =0
     9. Channel Enable Method (0-5)=0
     10. (Enable Threshold) or (Enable Channel)
     11. (Antenna Channel) or (Scale Factor)
Enter item number to change or "a" to abort, or "e" to end programming this channel.

Each Analog Input Channel entry is described as follows:
1. CHANNEL TYPE (0-11)= is for entering one of twelve different channel types. The possible channel types are:
(0) Disabled
(1) 100 Watt transmitter sensor
(2) 1000 Watt transmitter sensor
(3) 100 Watt antenna sensor
(4) 1000 Watt antenna sensor
(5) Linear voltage input
(6) Degrees F temperature
(7) Degrees C temperature
(8) User defined conversion, Table
(9) User defined conversion, Table
(10) User defined conversion, Table
(11) User defined conversion, Table
Type 0 denotes that the analog channel is disabled and all inputs will be ignored.

Types (1-2). The transmitter sensors are characterized within the master unit from empirical data taken over a quantity of sensors. For a particular dc input taken from a sensor and read on an analog input, a value of Watts will be interpreted by the master unit and reported as a measurement.

If types 1 or 2 are selected, an antenna channel must be entered corresponding to the analog channel. If the same sensor is measuring power for both the transmitter and antenna, the antenna channel will be the same as the transmitter analog channel.

Types (3–4). The antenna sensors are characterized the same as the transmitter sensors.

Type (5). The linear voltage input type provides for a 0 to 1 voltage reading for 0 to 5 volt input to the analog channel. If type 5 is selected for an analog input, a scale factor provision will show on the ANALOG INPUT CHANNEL Menu. For a scale factor 5, 0 to 5 volt input to the analog channel will be interpreted by the master unit as 0 to 5 volts.

2. Description, it is not programmed.

3. Unit ID, permits entry of 4 alphanumeric characters.

4. Measurement units, permits entry of 7 alphanumeric characters.

5. Lower Alarm Limit, permits entry of 7 digits plus a negative sign.

6. Upper Alarm Limit, permits entry of 7 digits plus a negative sign. (With no negative sign a positive sign is assumed for 5 and 6).

7. Alarm report types, when the master unit places an alarm call, it must know the recipient of the call and how to talk to that recipient. Four types are designated as follows: (1) a computer or terminal; (2) a maintenance technician with a pager; (3) an emergency department (fire, flood, police, etc); and (4) a security department. The master unit is set up to generate all four types; thus 1, 2, 3, 4, may be entered for the report types.

8. Alarm relay number is the relay number to be energized when this channel is in the alarm state. Any one of the 80 relays may be selected. Multiple inputs may select the same relay. If the analog channel number goes into alarm, the selected relay will energize, thus, opening or closing a circuit.

9. Six different channel enable methods are possible, one may be selected for each analog input. The methods are: (0) Use analog threshold; (1) Enable when specified analog channel is enabled; (2) Enable when specified analog channel is alarmed; (3) Enable when specified digital channel is true; (4) Enable when specified digital channel is false; and (5) Always enable. When (0) is selected for the enable method, the analog input will enable itself and show value when it has an input. By this enable method, an enable threshold entry will be required. The selection of (1), (2), (3), or (4) require other channel states for enable. For example: It may be desired to read a transmitter power output only when a power amplifier is keyed. Thus, the analog channel showing transmitter power should be enabled by a digital channel, (3) or (4).

10. Enable channel, this is the specified analog or digital channel for the channel enable method.

11. Antenna channel, this channel should be given a separate analog input channel if the normal measurement of the transmitter output will be different from the antenna input by a significant measure (0.2 to 4 dB), and separate sensors are used for the transmitter output and antenna input. An input scale factor is assigned only when a type 5 analog input is selected.

ANALOG PSEUDO CHANNEL

If menu item "4" (Analog Pseudo Channel) is selected, an instruction 850 is issued for and a prompt will ask for a channel number. Analog pseudo channels 1–128 are provided for. On selection of the analog pseudo channel number, an instruction 852 is issued to display the following prompts for inputs.

1. Channel type (0–8)=
2. Description=
3. Unit ID=
4. Measurement Units=
5. Lower Alarm Limit=
6. Upper Alarm Limit=
7. Alarm Report Types (1, 2, 3, 4)=
8. Alarm Relay Number=
9. Channel Enable Method (0–5)=(not used)
10. "A" Channel=
11. "B" Channel=
12. Channel Scaling Exponent=

Enter item number to change, or "A": to abort, or "E" to end programming this channel selection.

These items are explained as follows:

1. The (0–8) channel types are: (1) SWR, (2) IL (insertion loss), (3) A+B, (4) A−B, (5) A*B, (6) A* B/10,000 (7) A/B , and (8) A/B* 10,000. When A and B are separate analog channels.

2–6. The description is 16 alphanumeric characters, the unit ID is 4 alphanumeric characters, and the measurement units are 7 alphanumeric characters. The lower and upper alarm limits are 7 digits plus a negative sign; if no negative sign appears a positive number is to be assumed.

7. The alarm report types (1, 2, 3, 4) are the same as analog input channels. When an alarm call is placed, it must know to the recipient of the call and how to talk to the recipient. Four types have been designated: (1) a computer or terminal; (2) a maintenance technician with a paper; (3) an emergency department (fire, police, flood, etc.); and (4) a security department. When a 1, 2, 3, and/or 4 are entered corresponding instructions are issued to place the call.

8. For the alarm relay number, the relay number to be energized when the selected channel is in the alarm state is entered. Any one of the 80 relays may be selected. Multiple inputs may select the same relay. If the analog channel number goes into alarm, the selected relay will energize, thus, opening or closing a circuit.

9. The channel Enable Method (0–5) is not used.

10. For the "A" channel prompt, an analog channel for calculation is specified SPELLEDOUT AIXXX.

11. For the "B" channel prompt, the other analog channel calculation is specified—SPELLEDOUT AIXXX.

12. For the channel scaling exponent prompt a 2 entry should be made for SWR and insertion loss calculations, as the highest value of either will not be calculated above 99.099. Other exponent values for the other 6 analog pseudo channel types should be calculated and entered accordingly.

DIGITAL INPUT CHANNEL

When the digital input channel is selected by entering 3 for setup, an instruction 854 is issued to display a prompt for entering the digital channel number. Any of 94 digital channels may be selected at this point. Appendix 1 contains the specific pinouts of the master unit for each of the transmitter groups (TXG1-TXG8). The groups are also referred to as ports.

Upon channel selection an instruction 856 is issued for and the following prompts are displayed.

1. Channel selected (Y/N)=Y or N. (A yes indicates that this digital channel is being selected for data input or to enable other channels; a no indicates this channel is not selected for data input or to enable other channels).
2. Description=(16 alphanumeric characters)
3. Unit ID=(4 alphanumeric characters)
4. Active (T) state (H/L)=(high or low active true state for digital input.)
5. Debounce Time (*¼ sec)=(enter number of ¼ seconds to allow digital signal to reach active or inactive state.)
6. Stuck High timeout (*¼ sec)=(enter maximum number of ¼ seconds for a digital signal to stay in the high state.)
7. Stuck Low Timeout (*¼ sec)=(enter the maximum number of ¼ seconds for digital signal to stay in low state.)
8. Alarm types (D, N, H, L)=(all four may be selected, D is the debounced state alarm; N is the non-debounced state alarm; H is the stuck high timeout; and L is the stuck low timeout.)
9. Alarm report types (1, 2, 3, 4)=(same as for analog input channel.)
10. Alarm relay number=(same as for analog input channel.)
11. "AND" enable functions:
    A1=E, T, AI001MS01
    A2=E, T, AI001,S01
    A3=E, T, AI001,S01
    A4=E, T, AI001S01

(Each input to the "AND" logic gates (FIG. 14) are described and controlled by 4 function descriptors: (1) E stands for enabled, L stands for logic [under E the "And" input is always enabled regardless of the other descriptors; under L, data will be processed and interpreted received from the designated analog or digital channel.] (2) T stands for true and F stands for false [data received from a channel is to be taken as received (T) or reversed (F)). ] (3) AI001-AII28, or DI101-DI96, or AP001-AP128, or DP001-DP64 indicate the channel number. (4) S01-S08 indicates S field data [the logic state or alarm state of a channel may be used to enable an "AND" input. If the logic state is used, the logic condition for enable is in accord with the following truth table.

TRUTH TABLE

| S   | NONDEBOUNCED STATE | DEBOUNCED STATE |
|-----|--------------------|-----------------|
| S01 | 0                  | 0               |
| S02 | 0                  | 0               |
| S03 | 1                  | 0               |
| S04 | 1                  | 1               |
| S05 | X                  | 0               |
| S06 | X                  | 1               |
| S07 | 0                  | X               |
| S08 | 1                  | X               |

The four descriptors may be changed or redescribed by selecting No. 11 on the digital pseudo channel menu.]

DIGITAL PSEUDO CHANNEL

Upon selection of "5" of the setup menu, data input for a digital pseudo channel may be entered. Upon selection, an instruction 854 is issued to display a prompt; the prompt will ask for a channel number. Digital pseudo channels 1-64 are provided for. On selection of the digital pseudo channel number, an instruction 856 is issued to display a menu as follows:

1. Channel Selected (Y/N)=(enter Y to setup a digital pseudo channel.)
2. Description=(not programmed)
3. Unit ID=(4 alphanumeric characters.)
4. Active (T) state (H/L)=(sets up the active state as a logic high or low.)
5. Debounce Time (*¼ sec)=(same as for DI Channel).
6. Stuck High Timeout=(same as for 5)
7. Stuck Low Timeout=(same as for 5)
8. Alarm Types (D, N, H, L)=(same as for 5)
9. Alarm Report Types (1, 2, 3, 4)=(same as for analog pseudo channel.)
10. Alarm Relay Number=(The relay number 1-80 is entered for the relay to be energized when this channel is in alarm. 0 would dictate that no relay is to be energized on alarm.)
11. "AND" logic functions:

| AI = E, T, AI001, S01 | A3 = E, T, AI001, S01 |
|-----------------------|-----------------------|
| A2 = E, T, AI001, S01 | A4 = E, T, AI001, S01 |
| B1 = E, F, AI001, S01 | B3 = E, T, AI001, S01 |
| B2 = E, F, AI001, S01 | B4 = E, T, AI001, S01 |
| C1 = E, F, AI001, S01 | C3 = E, T, AI001, S01 |
| C2 = E, F, AI001, S01 | C4 = E, T, AI001, S01 |
| D1 = E, F, AI001, S01 | D3 = E, T, AI001, S01 |
| D2 = E, F, AI001, S01 | D4 = E, T, AI001, S01 |

Enter item number to change, or "A" to abort, or "E" to end programming this channel.

RELAY OUTPUTS

Upon selection of 6 under the setup menu, an instruction 858 is issued to display relay output prompts for information for initialization of the relay outputs. The prompts are as follows:

1. Channel Selected (Y/N)=(Yes enables the relay channel.)
2. Description=(16 alphanumeric characters)
3. Latched Mode Select (Y/N)=(Y latches the selected relay on alarm. The relay may be deenergized only if the alarm goes away and the timer has timed out.)
4. Debounce Time (*¼ sec)=(Time in ¼ seconds for relay to reach state for data acceptance.)
5. Max On-Time (minutes)=(On alarm, the selected relay may be timed to be energized. If the timer times out, the relay will be denergized only if the alarm that energized the relay is no longer in an alarm state.)

INPUT CONVERSION TABLE

Upon selection of 7 under the setup menu, an instruction 860 will be issued to display prompts for one of four particular inputs for data conversion selection as follows:

Enter Selection: (7)
Enter Table Number (0-3):
Exponent=(0 will expect all inputs to be between 0 and 1. Exponent 1 will expect all inputs to be between 1 and 10. Exponent 2 will expect all inputs to be between 10 and 100.
Table (0)=0.0000
Table (1)=1.0000
Table (2)=0.0078
Table (3)=2,0000

All 256 inputs must be entered.

ERASE ALL PROGRAMMING

Upon selection of (8) and instruction 862 will be issued to erase all information entries for setup.

RETURN TO OPERATIONS SELECT MENU

Upon selection of (9) an instruction 864 is entered to return and display the operations select menu.

| APPENDIX I. CHANNEL ASSIGNMENT TABLE | |
|---|---|
| PORT 1(TXG1) | PORT 2(TXG2) |
| PIN13-ANALOG INPUT #1 | ANALOG INPUT #5 |
| 25-ANALOG INPUT #1 RETURN | ANALOG INPUT #5 RETURN |
| 12-ANALOG INPUT #2 | ANALOG INPUT #6 |
| 24-ANALOG INPUT #2 RETURN | ANALOG INPUT #6 RETURN |
| 1-ANALOG INPUT #3 | ANALOG INPUT #7 |
| 23-ANALOG INPUT #3 RETURN | ANALOG INPUT #7 RETURN |
| 10-ANALOG INPUT #4 | ANALOG INPUT #8 |
| 22-ANALOG INPUT #4 RETURN | ANALOG INPUT #8 RETURN |
| 9-RELAY #1 DRIVER OUTPUT | RELAY #3 DRIVER OUTPUT |
| 21-BALANCED AUDIO LO | BALANCED AUDIO LO |
| 1-BALANCED AUDIO HIGH | BALANCED AUDIO HIGH |
| 20-GROUND | GROUND |
| 8-RELAY #2 (FORM C) N.O. | RELAY #4 (FORM C) N.O. |
| 7-RELAY #2 (FORM C) COMMON | RELAY #4 (FORM C) COMMON |
| 6-RELAY #2 (FORM C) N.C. | RELAY #4 (FORM C) N.C. |
| 5-DIGITAL INPUT #1(+) | DIGITAL INPUT #3(+) |
| 4-DIGITAL INPUT #1(−) | DIGITAL INPUT #3(−) |
| 3-DIGITAL INPUT #2(+) | DIGITAL INPUT #4(+) |
| 2-DIGITAL INPUT #2(−) | DIGITAL INPUT #4(−) |
| PORT 3 (TXG3) | PORT 4 (TXG4) |
| ANALOG INPUT #9 | ANALOG INPUT #13 |
| ANALOG INPUT #9 RETURN | ANALOG INPUT #13 RETURN |
| ANALOG INPUT #10 | ANALOG INPUT #14 |
| ANALOG INPUT #10 RETURN | ANALOG INPUT #14 RETURN |
| ANALOG INPUT #11 | ANALOG INPUT #15 |
| ANALOG INPUT #11 RETURN | ANALOG INPUT #15 RETURN |
| ANALOG INPUT #12 | ANALOG INPUT #16 |
| ANALOG INPUT #12 RETURN | ANALOG INPUT #16 RETURN |
| RELAY #5 DRIVER OUTPUT | RELAY #7 DRIVER OUTPUT |
| BALANCED AUDIO LO | BALANCED AUDIO LO |
| BALANCED AUDIO HIGH | BALANCED AUDIO HIGH |
| GROUND | GROUND |
| RELAY #6(FORM C) N.O. | RELAY #8(FORM C) N.O. |
| RELAY #6(FORM C) COMMON | RELAY #8(FORM C) COMMON |
| RELAY #6(FORM C) N.C. | RELAY #8(FORM C) N.C. |
| DIGITAL INPUT #5 (+) | DIGITAL INPUT #7 (+) |
| DIGITAL INPUT #5 (−) | DIGITAL INPUT #7 (−) |
| DIGITAL INPUT #6 (+) | DIGITAL INPUT #8 (+) |
| DIGITAL INPUT #6 (−) | DIGITAL INPUT #8 (−) |

Although only a single embodiment of the invention has been disclosed, it will be apparent to a person skilled in the art that various modifications to the details of construction shown and described may be made without departing from the scope of this invention.

What is claimed is:

1. An electronic monitoring apparatus for monitoring a communications system having a transmitter and an antenna comprising:
   sensor means for connection between the transmitter and antenna for producing selected power measurements;
   a programmable controller connected to the sensor means, said programmable controller including first means operatively connected to the sensor means for continuously monitoring the power measurements, comparator means for comparing the power measurements with preselected tolerable upper and lower power limits and second means connected to the comparator means for generating digitized information signals indicative of a need for maintenance operations prior to failure of the communications system; and
   communication means connected to the programmable controller for automatically communicating the digitized information signals over a communication media.

2. The electronic monitoring apparatus according to claim 1 wherein the second means produces dual tone multifunction coded digitized signals for transmission over the communication means.

3. The electronic monitoring apparatus according to claim 1 wherein the second means includes means for producing digitized voice signals, and said communication means is a wireless radio for communication over the air.

4. An electronic communication system monitoring system comprising in combination:
   a central processing means for executing programmed instructions, the central processing means including an input/output means, a memory driver and memory connected to the input/output means; and
   a plurality of sensor means connected to the central processing means, said plurality of sensor means including a plurality of selected system element sensors and a plurality of environment sensors for measuring operational conditions of a communication system including system element operating conditions and environmental conditions at the communication system and a plurality of relays interconnecting sensed communication system elements to the central processing means for operational control;

said central processing means further including first means connected to the plurality of selected system element sensors for receiving a plurality of condition indicating signals for elements whose operational status is necessary for correctly determining any potential problem, second means connected to the first means and responsive to the plurality of condition indicating signals for outputting a control signal to a protective means for seletively controlling operation of the protective means, and a protective means connected to the second means and responsive to a control signal for automatically alleviating conditions indicated by the plurality of selected system element sensors which if not corrected will ultimately lead to system failure.

5. The electronic communication system monitoring system according to claim 4 wherein the plurality of environment sensors of the plurality of sensor means include a plurality of relays and the central processing means further includes a plurality of alarms and the input/output means includes a portable display and keyboard means connected to the central processing means for on-site interrogation and interpretation of data relating to a group of data consisting of alarm status, relay status, on-site measurements, and remote data transfer.

6. An electronic communication system monitoring system comprising in combination:
   a central processing means for executing programmed instructions, the central processing means including an input/output means, a memory drive and memory connected to the input/output means; and
   a plurality of sensor means connected to the central processing means, said plurality of sensor means for measuring operational conditions of a communication system and environmental conditions at the communication system, and a plurality of relay means for selectively connecting the plurality of sensor means to the central processing means for operational control;
   said central processing means further including means connected to the plurality of sensor means for comparing sensed operation conditions with preselected limits and outputting an alarm signal when conditions outside the preselected limits exist, a voice message synthesizing means connected to the central processing means and responsive to the alarm signal for preparing a message for dispatch, and communication means connected to the central processing means and responsive to the alarm signal for communicating the message to preselected recipients.

7. The electronic communication system monitoring system according to claim 6 wherein the communication means is a modem preselected for telephone communications and radio communications.

8. The electronic communication system monitoring system according to claim 6 wherein the central processing means further includes a report means connected to the central processing means memory for producing reports selected from a group of reports consisting of alarm history, status, relay status, channel monitor, and channel-on timer reports.

9. The electronic communication system monitoring system according to claim 6 further including a display means connected to the central processing means and wherein the central processing means further includes means for generating a manual contral menu for display by the display means, and means connected to the display means for providing display prompts for manual control guidance.

10. The electronic communication system according to claim 6 further including a display means connected to the central processing means and wherein the central processing means further includes means connected to the display means for producing a setup menu for display, and means connected to the display means for providing display prompts for setup guidance.

11. An electronic monitoring apparatus for monitoring a communications system having a transmitter and an antenna comprising:
   sensor means connected between the transmitter and antenna for producing selected power measurements;
   a programmable controller connected to the sensor means, said programmable controller including first means operatively connected to the sensor means for continuously monitoring operation of the communications system including power measurements, comparator means connected to the first means for comparing the power measurements with preselected tolerable upper and lower power limits and outputting signals indicative of a need for maintenance operations prior to failure of the communications system, a second means connected to the comparator means and responsive to the signal output thereof for preparing a maintenance message, storage means connected to the programmable controller and containing a preselected number of telephone numbers of key personnel, and third means connected to the storage means and responsive to the output signals of the comparator means for sequentially obtaining the key personnel telephone numbers for automatically dialing; and
   a communication means connected to the programmable controller for communicating the maintenance message indicator of the need for a maintenance operation to the key personnel.

12. The electronic monitoring apparatus according to claim 3 wherein the communication means is a telephone.

13. An electronic communication system monitoring system comprising:
   a plurality of transmitting antennas for transmitting electromagnetic energy;
   a plurality of communication transmitter channels connected to the plurality of transmitting antennas, the plurality of communication transmitter channels including a plurality of transmitters for transmitting electromagnetic energy, a plurality of power circulators connected to the plurality of transmitters and a plurality of combiners connected to the plurality of power circulators, said plurality of power combiners being connected to the plurality of transmitting antennas;
   a plurality of power sensors operatively connected to the plurality of communication transmitter channels including a plurality of analog signal producing sensor means connected to the plurality of communication transmitter channels for producing analog signals indicative of input powers (IPF) of the plurality of transmitters to the plurality of combiners and reflected transmitter powers (IPR) on input sides of the plurality of combiners;

a plurality of analog signal producing sensor means connected to the plurality of communication transmitter channels for producing analog signals indicative of reflected powers (OPR) from antenna sides of the plurality of combiners and combiner powers (OPF) to the plurality of transmitting antennas;

a controller station including a programmable controller and a plurality of environmental sensors connected to the programmable controller for producing signals indicative of controller station environmental conditions taken from a group consisting of analog and digital signals; said programmable controller having: first means connected to the plurality of power sensors for producing IPF, IPR, OPF, and OPR measurements, second means selectively connected to the first means for computing transmitter and antenna voltage standing wave ratios, third means connected to the first means for determining combiner insertion loss per channel, a clock means connected to the programmable controller, a fourth means connected to the clock means for obtaining time and date of measurements, fifth means connected to the fourth means for recording the time and date of most recent channel measurements, sixth means connected to the environmental sensors for automatically producing alarm signals indicative of abnormal environmental conditions, comparator means selectively connected to the first means for comparing the measurements to preselected acceptable normal measurements and producing alarm signals indicative of outside the normal measurements, display means connected to the programmable controller for displaying locally the measurements made, data input means connected to the programmable controller for reading operating parameters into and writing measurement information from the programmable controller, said programmable controller having a communication port means for connecting a printer, and a signal digitizing means connected to the comparator means for generating digital information signals indicative of a need for maintenance;

a transmitter/receiver means connected to the signal digitizing means for communicating the digital information signals over a communication media; and a remotely located station includinng a means connected to the transmitter/receiver means for reading operating parameters into, writing data including measurement data and alarm data from the programmable controller, and receiving the digitized information signals for audio reproduction.

* * * * *

UNITED STATES PATENT AND TRADEMARK OFFICE
CERTIFICATE OF CORRECTION

PATENT NO. : 4,964,065

DATED : October 16, 1990

INVENTOR(S) : Hicks et al.

It is certified that error appears in the above-identified patent and that said Letters Patent is hereby corrected as shown below:

Column 1, line 6, "applicaiotn" should read -- application --.

Column 1, line 18, "circular" should read -- circulator --.

Column 2, line 32, "alarm" should read -- alarm, --.

Column 5, line 50, "chamber" should read -- combiner --.

Column 13, line 43, "380" should read -- 630 --.

Column 14, line 9, "center" should read -- central --.

Column 16, line 59, "form" should read -- from --.

Column 16, line 65, "port" should read -- port, --.

Column 17, line 63, after the line "EMERGENCY ONLY***", insert -- ENTER SELECTION --.

UNITED STATES PATENT AND TRADEMARK OFFICE
CERTIFICATE OF CORRECTION

PATENT NO. : 4,964,065

DATED : October 16, 1990

INVENTOR(S) : Hicks, et al

It is certified that error appears in the above-identified patent and that said Letters Patent is hereby corrected as shown below:

Column 22, line 14, "uptime" should read -- up time --.

Column 23, line 14, "to roll," should read -- to roll. --.

Column 32, line 3, "contral" should read -- control --.

Column 34, line 23, "includinng." should read -- including --.

Signed and Sealed this

Twenty-second Day of September, 1992

Attest:

DOUGLAS B. COMER

*Attesting Officer*   Acting Commissioner of Patents and Trademarks